(12) United States Patent
Guthery et al.

(10) Patent No.: US 10,791,106 B2
(45) Date of Patent: *Sep. 29, 2020

(54) DIGITAL CREDENTIAL WITH EMBEDDED AUTHENTICATION INSTRUCTIONS

(71) Applicant: ASSA ABLOY AB, Stockholm (SE)

(72) Inventors: Scott B. Guthery, Chestnut Hill, MA (US); Ronny Belin, Sollentuna (SE)

(73) Assignee: ASSA ABLOY AB, Stockholm (SE)

( * ) Notice: Subject to any disclaimer, the term of this patent is extended or adjusted under 35 U.S.C. 154(b) by 90 days.

This patent is subject to a terminal disclaimer.

(21) Appl. No.: 16/234,090

(22) Filed: Dec. 27, 2018

(65) Prior Publication Data

US 2019/0207919 A1 Jul. 4, 2019

Related U.S. Application Data

(63) Continuation of application No. 14/772,882, filed as application No. PCT/IB2014/001571 on Mar. 14, 2014, now Pat. No. 10,212,144.

(Continued)

(51) Int. Cl.
*H04L 29/06* (2006.01)
*H04L 29/08* (2006.01)
*H04W 4/80* (2018.01)

(52) U.S. Cl.
CPC .............. *H04L 63/08* (2013.01); *H04L 63/04* (2013.01); *H04L 63/0428* (2013.01);

(Continued)

(58) Field of Classification Search
CPC ..... H04L 63/08; H04L 63/0428; H04L 67/10; H04L 63/20; H04L 63/123; H04L 63/04;
(Continued)

(56) References Cited

U.S. PATENT DOCUMENTS

| 4,888,801 A | 12/1989 | Foster et al. |
| 5,369,702 A | 11/1994 | Shanton |

(Continued)

FOREIGN PATENT DOCUMENTS

| EP | 1376932 A2 | 1/2004 |
| EP | 1571790 A2 | 9/2005 |

(Continued)

OTHER PUBLICATIONS

"U.S. Appl. No. 14/772,882, Final Office Action dated Dec. 28, 2017", 18 pgs.

(Continued)

*Primary Examiner* — Brandon S Hoffman
*Assistant Examiner* — William A Corum, Jr.
(74) *Attorney, Agent, or Firm* — Schwegman Lundberg & Woessner, P.A.

(57) ABSTRACT

Methods and systems are provided for sending messages in a security system. In particular, a new message syntax can include one or more positive assertions that may be verified. The receiver of the message or credential may verify all the positive assertions. In other configurations, one or more nodes that relay the message from the sender to the receiver can verify the positive assertions or may create one or more of the positive assertions. In this way, the network or entities used to relay the message can also be checked.

19 Claims, 9 Drawing Sheets

Related U.S. Application Data

(60) Provisional application No. 61/794,507, filed on Mar. 15, 2013.

(52) U.S. Cl.
CPC .......... *H04L 63/123* (2013.01); *H04L 63/126* (2013.01); *H04L 63/20* (2013.01); *H04L 67/10* (2013.01); *H04L 63/0245* (2013.01); *H04W 4/80* (2018.02)

(58) Field of Classification Search
CPC ... H04L 63/126; H04L 63/0245; H04W 4/008
See application file for complete search history.

(56) References Cited

U.S. PATENT DOCUMENTS

| | | |
|---|---|---|
| 5,369,707 A | 11/1994 | Follendore, III |
| 5,375,169 A | 12/1994 | Scheidt et al. |
| 5,410,599 A | 4/1995 | Crowley et al. |
| 5,432,851 A | 7/1995 | Scheidt et al. |
| 5,440,290 A | 8/1995 | Mccullough et al. |
| 5,787,173 A | 7/1998 | Scheidt et al. |
| 6,012,100 A | 1/2000 | Frailong et al. |
| 6,075,865 A | 6/2000 | Scheidt et al. |
| 6,092,191 A | 7/2000 | Shimbo et al. |
| 6,119,157 A | 9/2000 | Traversat et al. |
| 6,185,680 B1 | 2/2001 | Shimbo et al. |
| 6,229,445 B1 | 5/2001 | Wack |
| 6,266,417 B1 | 7/2001 | Scheidt et al. |
| 6,286,038 B1 | 9/2001 | Reichmeyer et al. |
| 6,490,680 B1 | 12/2002 | Scheidt et al. |
| 6,542,608 B2 | 4/2003 | Scheidt et al. |
| 6,549,623 B1 | 4/2003 | Scheidt et al. |
| 6,580,452 B1 | 6/2003 | Gangitano |
| 6,606,386 B2 | 8/2003 | Scheidt et al. |
| 6,608,901 B2 | 8/2003 | Scheidt et al. |
| 6,684,330 B1 | 1/2004 | Wack et al. |
| 6,686,838 B1 | 2/2004 | Rezvani et al. |
| 6,694,433 B1 | 2/2004 | Kolouch |
| 6,754,820 B1 | 6/2004 | Scheidt et al. |
| 6,845,453 B2 | 1/2005 | Scheidt et al. |
| 6,898,781 B2 | 5/2005 | Singh et al. |
| 7,003,663 B2 | 2/2006 | Lagosanto et al. |
| 7,016,495 B2 | 3/2006 | Scheidt et al. |
| 7,069,448 B2 | 6/2006 | Odell et al. |
| 7,079,653 B2 | 7/2006 | Scheidt et al. |
| 7,089,417 B2 | 8/2006 | Wack et al. |
| 7,095,851 B1 | 8/2006 | Scheidt |
| 7,095,852 B2 | 8/2006 | Wack et al. |
| 7,111,173 B1 | 9/2006 | Scheidt |
| 7,131,009 B2 | 10/2006 | Scheidt et al. |
| 7,178,030 B2 | 2/2007 | Scheidt et al. |
| 7,205,882 B2 | 4/2007 | Libin |
| 7,212,632 B2 | 5/2007 | Scheidt et al. |
| 7,281,133 B2 | 10/2007 | Ginter et al. |
| 7,532,725 B2 | 5/2009 | Berry et al. |
| 7,587,756 B2 | 9/2009 | Peart et al. |
| 7,647,498 B2 | 1/2010 | Brown et al. |
| 10,212,144 B2 | 2/2019 | Guthery et al. |
| 2004/0040026 A1 | 2/2004 | Farrugia |
| 2008/0022100 A1 | 1/2008 | Ginter et al. |
| 2008/0229099 A1 | 9/2008 | Kim et al. |
| 2009/0094660 A1 | 4/2009 | Weaver et al. |
| 2009/0235037 A1 | 9/2009 | Mounier et al. |
| 2012/0129493 A1* | 5/2012 | Vasudevan ........ H04W 12/0023 455/411 |
| 2012/0221473 A1* | 8/2012 | Redmann ................ B60L 53/18 705/50 |
| 2012/0280790 A1* | 11/2012 | Gerhardt ............ G07C 9/00571 340/5.61 |
| 2014/0143137 A1* | 5/2014 | Carlson ................. G06Q 20/02 705/39 |
| 2016/0028708 A1 | 1/2016 | Guthery et al. |
| 2018/0033226 A1* | 2/2018 | Robertson ................ G07C 9/28 |

FOREIGN PATENT DOCUMENTS

| | | |
|---|---|---|
| EP | 1583318 A2 | 10/2005 |
| WO | WO-2011045714 A2 | 4/2011 |

OTHER PUBLICATIONS

"U.S. Appl. No. 14/772,882, Non Final Office Action dated May 23, 2018", 18 pgs.

"U.S. Appl. No. 14/772,882, Non Final Office Action dated Sep. 7, 2017", 15 pgs.

"U.S. Appl. No. 14/772,882, Notice of Allowance dated Oct. 1, 2018", 13 pgs.

"U.S. Appl. No. 14/772,882, Preliminary Amendment filed Sep. 4, 2015", 7 pgs.

"U.S. Appl. No. 14/772,882, PTO Response to Rule 312 Communication dated Dec. 19, 2018", 2 pgs.

"U.S. Appl. No. 14/772,882, Response filed Apr. 30, 2018 to Final Office Action dated Dec. 28, 2017", 11 pgs.

"U.S. Appl. No. 14/772,882, Response filed Aug. 23, 2018 to Non Final Office Action dated May 23, 2018", 12 pgs.

"U.S. Appl. No. 14/772,882, Response filed Dec. 7, 2017 to Non Final Office Action dated Sep. 7, 2017", 7 pgs.

"European Application Serial No. 14758166.4, Communication Pursuant to Article 94(3) EPC dated Mar. 27, 2017", 6 pgs.

"International Application Serial No. PCT/IB2014/001571, International Preliminary Report on Patentability dated Sep. 24, 2015", 8 pgs.

"International Application Serial No. PCT/IB2014/001571, International Search Report dated Nov. 10, 2014", 4 pgs.

"International Application Serial No. PCT/IB2014/001571, Written Opinion dated Nov. 10, 2014", 6 pgs.

Karjoth, et al., "Mobile Agents and Telcos' Nightmares", Annals of Telecommunications, vol. 55(7), (2000), 388-400.

Knoll, et al., "Path-based Security for Mobile Agents", Electronic Notes in Theoretical Computer Science, vol. 63, (2002), 108-123.

Nitschke, et al., "Mobile Agent Security—An Overview", <https://www.researchgate.netlprofile/ Marcin Paprzycki/publication/242385755_M081LE_AGENT_SECURITY-_AN_OVERVIEW/links/Oa85e53be413a5ff52000000.pdf>, (2004), 1-10.

Posegga, et al., "Mobile Agents and Telcos' Nightmares", <https://web.sec.uni-passau.de/papers/nightmare.pdf>, (1999), 1-28.

Riordan, et al., "Environmental Key Generation Towards Clueless Agents", <https://www.schneier.com/cryptography/paperfiles/paper-clueless-agents.pdf>, (1998), 1-10.

\* cited by examiner

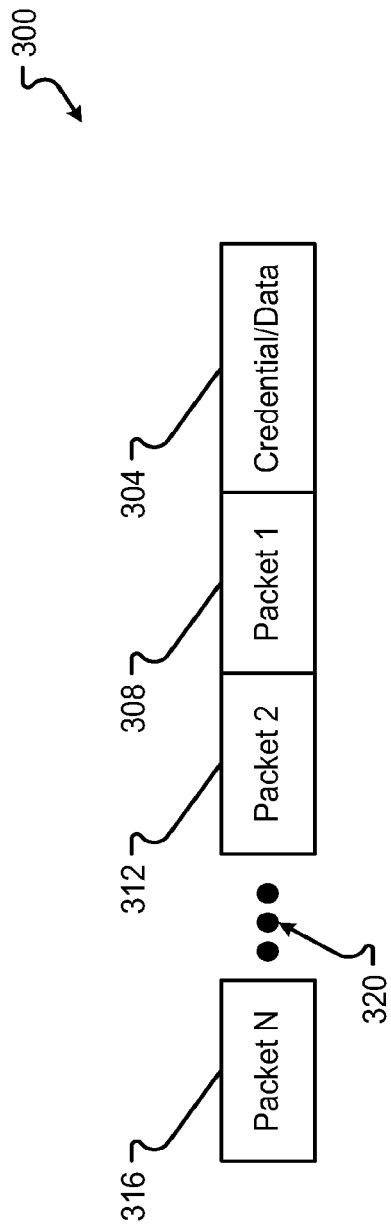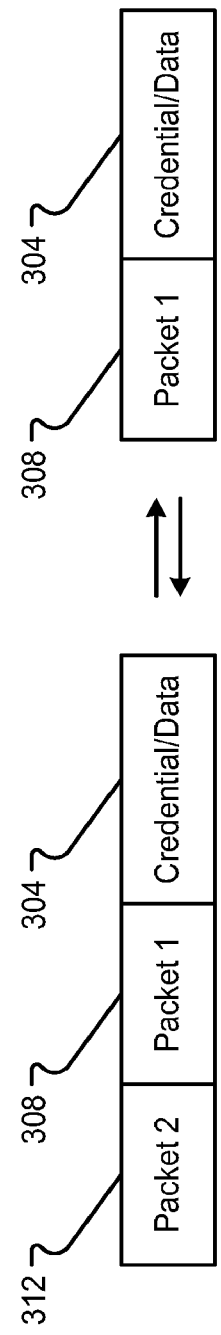
Fig. 3A
Fig. 3B

DIGITAL CREDENTIAL WITH EMBEDDED AUTHENTICATION INSTRUCTIONS

CROSS REFERENCE TO RELATED APPLICATION

This application is a continuation of U.S. patent application Ser. No. 14/772,882, filed Sep. 4, 2015, which is a national stage application under 35 U.S.C. 371 of PCT Application No. PCT/IB2014/001571 having an international filing date of Mar. 14, 2014, which designated the United States, which PCT application claims priority, under 35 U.S.C. § 119, to U.S. Provisional Patent Application No. 61/794,507, filed Mar. 15, 2013, each of which is incorporated by reference in its entirety for all that it teaches and for all purposes.

FIELD OF THE DISCLOSURE

The present disclosure is generally directed toward authenticating credentials.

BACKGROUND

Creating and issuing access credentials for a typical security system sometimes requires that the credentials be sent to a device or entity. Therefore, sensitive data (e.g. a digital key) is transmitted from an originating sending entity (e.g. a hotel reservation system) to a final receiving entity (e.g. a door lock) via at least one intermediate bearer entity (e.g. a mobile telephone). Generally, a receiving entity will need to verify that the sensitive data has come from an authorized sending entity and has not been altered in transit. However, this approach is limiting. The checks performed by the receiving entity do not place security requirements on any bearer entity.

The current systems include data security means and methods that enable a receiving entity to establish the integrity of a message and to establish that the message was created by a recognized sending entity. For example, the message may include a message authentication code (MAC) computed with a cryptographic key shared by the sending entity and the receiving device. The MAC is verified to determine that the message has not been tampered with. Generally, a receiving entity can establish the authenticity of a fixed population of penultimate intermediate entities. For example, the receiving entity may be enabled to conduct a fixed authentication.

Much of the existing secure message communication systems or methods assume a "dumb pipe" between the sending entity and the receiving entity. This "dumb pipe" architecture does not ignore the possibility that hostile entities may have captured one or more links in the communication path from the sending entity to the receiving entity. Rather, current systems and methods concentrate on differentiating between dumb and hostile. If hostility is detected, then the message is regarded as compromised. If hostility is not detected, then dumbness of the communication path is confirmed, and the receiving entity may proceed to verify that the message is from an acceptable sending entity.

There are at least two disadvantages of the current systems. A first disadvantage is that message verification by the receiving entity is static. For example, in the case where a door lock is unlocked by an integrated circuit card of a mobile device, the door lock may be able to validate that an offered door-opening card is a member of a single, fixed population of cards or, equivalently, an element of a specific access control system. However, should it be desirable to allow cards from a different system to operate with the door lock permanently or temporarily (or should it be desirable to alter the security of the existing system), each lock would have to be physically visited and changed to include a new list of cards.

A second disadvantage is that the current systems do not address the entire communication path between the sending entity and the receiving entity when performing message verification. In the case of the door lock used with a mobile phone, the door lock may be able to verify that the mobile phone is owned by a particular individual but the door lock is not able to establish that a particular short message system center was a component of the communication pathway from the hotel reservation system to the mobile phone.

SUMMARY

It is, therefore, one aspect of the present disclosure to provide a compact and operational encoding of instructions for the execution of data security protocols optionally including material to be used in conducting the protocols. Further, one aspect of the present disclosure provides a syntax and semantics for the encoding of a message containing sensitive data that incorporates the data security protocol instructions. Also, an aspect of the present disclosure provides an "onion skin" encapsulation architecture for messages such that encoding of messaged can directed to the multiple links in a multi-link or multi-hop communication scheme. The message encoding proposed herein is suitable for processing and execution by small foot-print devices, for example, mobile telephones, integrated circuit cards, door locks, processors thereof, etc.

The systems and methods described herein provide a third possibility beyond simply differentiating between dumb or hostile communication pathways. Namely, the message architecture described herein can be asserted on the nodes and links of a multi-hop communication path between the sending entity and the receiving entity. The message architecture can provide a specific and positive assertion about or to these intermediate communication components.

As an example, in a communication path from a hotel reservation system to a door lock that includes the mobile telephone communication network, a specific and positive assertion might be: "The message must pass through Sally Green's mobile telephone," or, perhaps more strongly, "The penultimate node in the communication path—the node that passes the message to the lock—shall be Sally Green's mobile telephone." This assertion is more elaborate that the either-or assertion of whether the message or communication pipe is hostile or benign. Further, the assertion is a positive assertion; e.g., it requires that Sally's phone gives the message to the lock.

Such positive assertions can be more complex than that provided in this example. Elaborating on the above example, a positive assertion can also be, "The message must have been handled by the TeliaSonera mobile phone system; the penultimate node must be Sally Green's mobile phone or Bobby Blue's mobile phone; and the mobile phone must be registered on a base station in the city of Stockholm." Thus, several positive assertions may be provided and may be directed to the endpoint and/or one or more intermediate nodes or links between the sending entity and the receiving entity.

The systems, methods, etc. as described herein provide that the message, to be sent, is fully encapsulated by the sending entity. As the message travels through the multi-hop communication path from the sending entity to the receiving entity, each intermediate node checks the outer-most encapsulation. If the outer-most encapsulation is unrecognized, then the intermediate node acts as a "dumb node" and simply passes the message along. If the outer-most encapsulation is recognized, then the outer-most encapsulation is de-capsulated and interpreted, and the assertions therein are verified. If the verifications are successful, the inner-message is passed along. The verification of the outer-most encapsulation can include any known or future-developed checks for hostile interference on nodes and links between the node performing the de-capsulation and the original sending node.

Thus, one favorable advantage of the systems, methods, etc. of the current disclosure are that the message may get smaller as the message travels from the originating sending entity to final receiving entity. Another favorable advantage is that the final receiving entity must only verify assertions relevant to the receiving entity's position in the communication path and not verify assertions to other positions. Nevertheless, the systems, methods, etc. of the current disclosure can, if desired, implement the process wherein each intermediate node re-encapsulated and signed the message.

Embodiments include a method for transmitting a message including credential information, comprising: generating credential information at a sender; creating a first positive assertion that is associated with a first intermediate bearer node between the sender and a receiver of the credential information; encapsulating the credential information and the positive assertion into a first packet; and sending the first packet to the receiver.

An aspect of the above method includes wherein the sender creates the first positive assertion.

An aspect of the above method further comprises the sender creating a second positive assertion for a second intermediate bearer node.

An aspect of the above method further comprises before sending the first packet, the sender encapsulating the second positive assertion with the first packet to create a second packet.

An aspect of the above method further comprises the sender sending the second packet to the receiver via a second intermediate bearer node.

An aspect of the above method further comprises: the second intermediate bearer node de-capsulating the second packet; verifying the second packet by conducting a first operation associated with the second positive assertion; and if the second packet is verified, the second intermediate bearer node sending the first packet to the first intermediate node.

An aspect of the above method includes wherein the first intermediate bearer node creates the first positive assertion.

An aspect of the above method further comprises a second intermediate bearer node creating a second positive assertion.

An aspect of the above method further comprises the second intermediate bearer node encapsulating the second positive assertion with the first packet to create a second packet.

An aspect of the above method further comprises the second intermediate bearer node sending the second packet to the receiver.

Embodiments include a device, comprising: a memory; a processor in communication with the memory, the processor operable to execute one or more modules, the modules comprising: an encapsulator/de-capsulator operable to: receive the first message; de-capsulate the first message to read a first positive assertion in the first message; provide the first positive assertion to a verifier/authenticator; the verifier/authenticator operable to: read the first positive assertion; and conduct an operation associated with the first positive assertion to verify the first message, wherein the first message includes credential information for a receiver.

An aspect of the above device includes wherein the device is one of an intermediate bearer node or the receiver.

An aspect of the above device includes wherein the modules further include an identifier operable to: read the first message; determine if the first message is recognized; if the first message is recognized, sending the first message to the encapsulator/de-capsulator; and if the first message is not recognized, forwarding the first message to one of a second intermediate bearer node or the receiver.

An aspect of the above device includes wherein the first message includes: a credential class including an access rule that includes the first positive assertion; and one or more of: a bounds class; a types class; a digital key value content class; an authentication device content class; a personal information content class; an information object class; a supported key identifiers class; a supported algorithms class; and a parameterized types class.

An aspect of the above device includes wherein the verifier/authenticator is further operable to create a second positive assertion;

An aspect of the above device includes wherein the an encapsulator/de-capsulator is further operable to: receive the second positive assertion from the verifier/autthenticator; and encapsulate the credential information and the second positive assertion into a second message.

Embodiments include a non-transitory computer readable medium, stored in a memory and read by a processor of a first intermediate bearer node, comprising: a first message comprising: a first encapsulation comprising a first credential class, the first credential class comprising: a first access rule species including a first positive assertion, the first positive assertion, when read by the processor, causes the processor to conduct a first operation to verify the authenticity of the first message; a credential.

An aspect of the above computer readable medium includes wherein the first encapsulation further comprises one or more of: a bounds class; a types class; a digital key value content class; an authentication device content class; a personal information content class; an information object class; a supported key identifiers class; a supported algorithms class; and a parameterized types class.

An aspect of the above computer readable medium includes wherein a sender generates the first and second encapsulations.

An aspect of the above computer readable medium includes wherein, if the processor of the first intermediate bearer node verifies the authenticity of the first message, the processor sends the first message, without the first encapsulation, to the second intermediate bearer node.

An aspect of the above computer readable medium further comprises: a second encapsulation comprising a second credential class, the second credential class comprising: a second access rule species including a second positive assertion, the second positive assertion directed to a second intermediate bearer node.

Embodiments include a method for receiving a message including a first packet and a second packet including credential information, comprising: de-capsulating the first packet; reading a first positive assertion in the de-capsulated first packet; verifying the first packet by conducting an operation associated with the first positive assertion; and if the first packet is verified, one of: sending the second packet to a receiver; or de-capsulating the second packet.

An aspect of the above method includes wherein an intermediate bearer node sends the second packet to the receiver.

An aspect of the above method includes when the receiver receives the second packet from the intermediate bearer node, the method further comprising: the receiver de-capsulating the second packet; the receiver reading a second positive assertion in the de-capsulated second packet; the receiver verifying the second packet by conducting a second operation associated with the second positive assertion; and if the second packet is verified, the receiver reading the credential information.

An aspect of the above method includes wherein the first packet is generated by an intermediate bearer node.

An aspect of the above method includes wherein the receiver de-capsulates the first and second packets, the method further comprising: the receiver reading a second positive assertion in the de-capsulated second packet; the receiver verifying the second packet by conducting a second operation associated with the second positive assertion; and if the second packet is verified, the receiver reading the credential information.

The term "semantics" can refer to the meaning of a message based on the units of the message.

The term "protocol" can refer to the rules that govern the exchange of messages or content between two or more entities.

The term "syntax" can refer to the arrangement of message units. Generally, syntax pertains to the rules that govern the structure of a message.

The term "encode" or "encoding" can refer to the process by which information from a source is converted into symbols to be communicated. Decoding is the process of converting the symbols back into information.

The terms "encapsulation" or "encapsulate" can refer to the process of enabling a communication protocol by abstracting underlying structures or data in a higher level object or data structure. Likewise, the term "de-capsulation" or "de-capsulate" can refer to the process of reading and/or interpreting outer-layers of an encapsulated message to expose underlying structures or data in a lower level object or data structure.

The term "sending entity" can refer to an entity that sends information, such as a credential.

The term "receiving entity" can refer to can refer to an entity that receives information, such as a credential.

The term "intermediate bearer entity" can refer to can refer to any node or link that bears or passes information, such as a credential, between a sending entity and a receiving entity.

The term "node" can refer to a connection point or a redistribution point. For example, a node can be an active electronic device, which is attached to a network, and may be capable of sending and/or receiving information over a communications channel.

The term "link" can refer to a communications channel that connects two or more nodes. The link may be an actual physical link or a logical link that uses one or more actual physical links. Generally, a link can refer to the communications facilities that connect nodes of a network.

The term "class" can refer to a group or set of data, information, objects, message characteristics, etc. that may share a characteristic or be substantially related.

The term "species" can refer to a particular item of data, item of information, object, message characteristic, etc. that may be a member of a class but have at least one dissimilar characteristic from the other members of the class.

The term "credential" can refer to any data or information that can establish the identity of a person, device, etc., and/or provide access to information, messages, communications, etc. The credential may be a computer-readable cryptographic key and/or password. The credential may be issued by a trusted third party. Further, the credential may require the association of the credential with an individual, entity, location, information, etc.

The term "positive assertion" can refer to any operation, authentication, verification, etc. required by one entity of another entity to ensure a message is authentic and/or not tampered with.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

Also, while the disclosure is described in terms of exemplary embodiments, it should be appreciated that aspects of the disclosure can be separately claimed. The present disclosure will be further understood from the drawings and the following detailed description. Although this description sets forth specific details, it is understood that certain embodiments of the disclosure may be practiced without these specific details. It is also understood that in some instances, well-known circuits, components and techniques have not been shown in detail in order to avoid obscuring the understanding of the invention The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

BRIEF DESCRIPTION OF THE DRAWINGS

The present disclosure is described in conjunction with the appended figures:

FIGS. 3A and 3B are block diagrams of embodiments of encapsulated messages that may be sent from a sending entity to a receiving entity;

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Copyright and Legal Notices

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
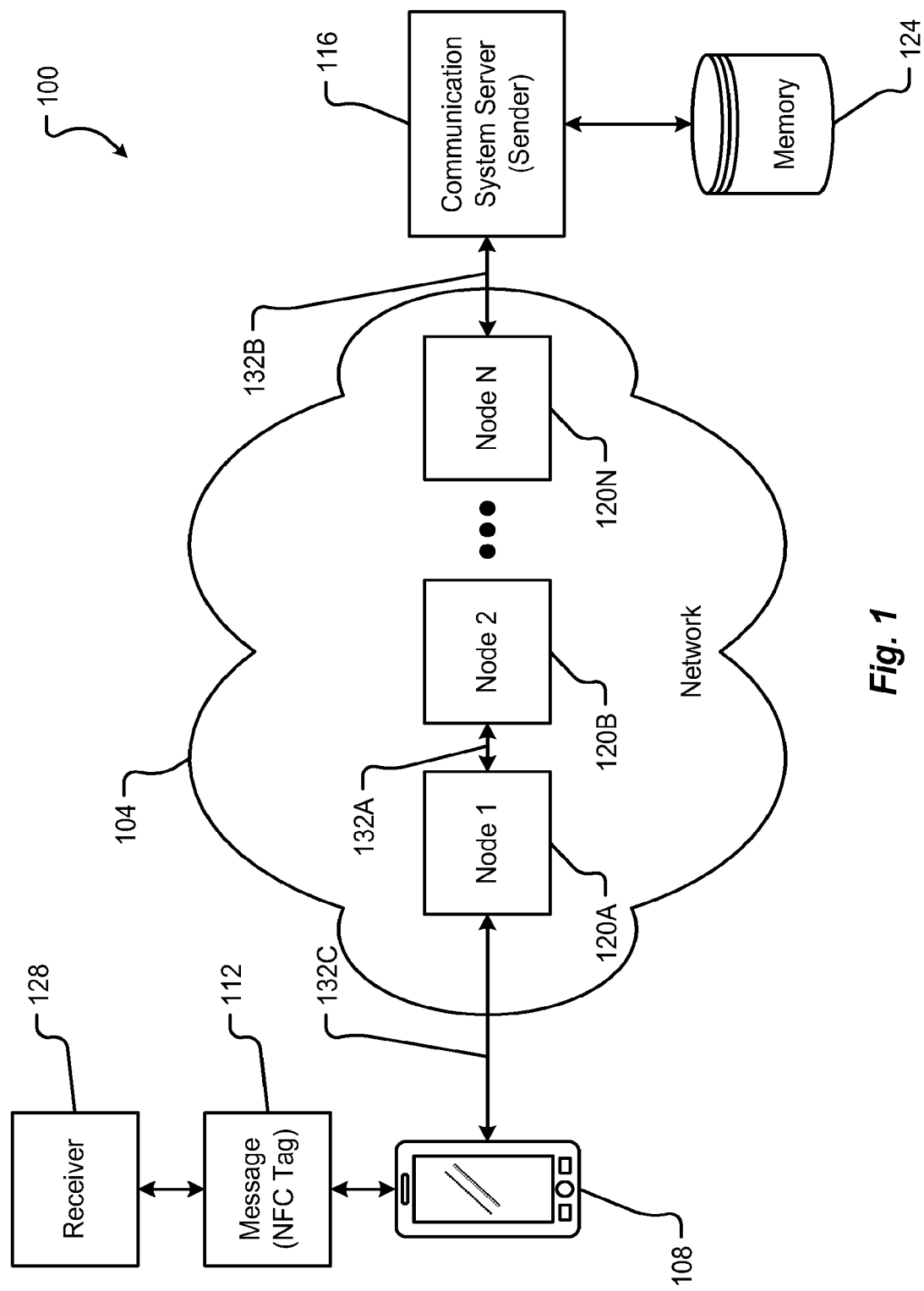
FIG. 1 is a block diagram of an embodiment of a communication system.

FIG. 1 shows a block diagram of a communication system 100. The communication system 100 can comprise a communication network 104, a mobile device 108, a receiver 128, a message or credentials 112, such as a Near Field Communication (NFC) credential, a memory 124 associated with the communication system server 116, which may be a sender of information, such as an NFC credential, and/or a memory 124 associated with the communication system server 116. As can be appreciated, one or more mobile devices 108 may access the communication system server 116 and/or associated memory 124 via the communication network 104.

The communication network 104 may comprise any type of known communication medium or collection of communication media and may use any type of protocols to transport messages between the sender 116 and the receiver 128. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Voice over IP (VoIP) network, a cellular network, and any other type of packet-switched or circuit-switched network known in the art. In addition, it can be appreciated that the communication network 104 need not be limited to any one network type, and instead may be comprised of a number of different networks and/or network types. Moreover, the communication network 104 may comprise a number of different communication media, such as, coaxial cable, copper cable/wire, fiber-optic cable, antennas for transmitting/receiving wireless messages, and combinations thereof.

The network 104 or the connections between the receiver 128 and sender 116 may include one or more intermediate bearer nodes 120, 108. For example, the network 104 shows node 1 120A, node 2 120B, and node N 120N comprising portions of the network 104. A node 120 can be any type of system, entity, device, etc. that is capable of receiving, forwarding, or transmitting the messages including credential information. As such, a node 120 can be any one of, but is not limited to, a router, a switch, an internet service provider, cellular tower, a transceiver, a Session Border Controller (SBC), a proxy server, a firewall server, or other types of devices and systems.

Each node 120 may be connected by a link 132. As such, each link 132 can be any type of communication medium that allows for the transmission and reception of data. For example, a link 132 can be a wired, wireless, or other connection between two different nodes 120. In some configurations of the system 100, the device 108 may also be an intermediate bearer node that transmits or relays data or credentials from the sender 116 to receiver 128.

The mobile device 108 may comprise any type of known communication equipment or collection of communication equipment operatively associated with at least one communication module and antenna, or transceiver. In some cases, the mobile device 108 may comprise a secure element. The secure element may be associated with the mobile device 108 and may be configured to securely store credentials, applications, and/or provide for the secure execution of associated applications. In some cases, the secure element may reside in a smart card chip, a subscriber identity module ("SIM") card, secure application module ("SAM") card, a secure digital ("SD") card, or other memory configured in a secure environment.

Examples of a suitable mobile device 108 may include, but are not limited to, a personal computer, laptop, Personal Digital Assistant (PDA), cellular phone, smart phone, tablet, mobile computing device, handheld radio, or combinations thereof. In general each mobile device 108 may be adapted to support video, audio, text, and/or data communications with other mobile devices 108 as well as one or more communication devices, nodes, links, and/or servers 120, 132, 116. The type of medium used by the mobile device 108 to communicate with other communication devices nodes, links, and/or servers 120, 132, 116 may depend upon the communication applications available on the mobile device 108. The mobile device 108 may correspond to a communication device associated with a receiver 128. It is anticipated that the mobile device 108 may comprise at least one secure memory, or memory that is capable of being at least partially secured. In one embodiment, the at least one secure memory may be used to store security keys, codes, identities, and/or other data that may be used by the mobile device 108 to communicate with a communication system server 116, a link 132, a recipient, combinations thereof, and/or other devices. As used herein, the secure memory may correspond to computer memory that is logically and/or physically secure. Examples of logically secure memory include a Trusted Execution Environment whereas examples of a physically secure memory include a secure element. Combinations of logically and physically secure memory are also well known in the art.

A communication system server 116, in accordance with embodiments of the present disclosure, may comprise a communication server or other dedicated processor that functions to provide services to devices (e.g., mobile devices 108, communication devices, receiver 128, etc.). A receiver 128 of the mobile device 108 may employ various applications on the server 112 and/or on the mobile device 108 to at least provide credentials creation communication functionality as disclosed herein.

The communication system server 116 may be associated with a server memory 124. In some embodiments, the server memory 124 may be configured to store information relating to one or more receivers 128, manufacturing information, security system preferences, standards, security information, mobile devices 108, permissions, encryption, user data, identification, location information, communication links, and the like. An administrative user may have access to the communication system server 116 and associated server memory 124 to manipulate data stored thereon. Among other things, an administrative user may view, register, modify, and/or cancel information associated with a receiver 128 and/or mobile device 108 via the server 112 and its associated memory 124. In some cases, the administrative user may override orders placed and/or information entered by a receiver 128 via an application running on the communication system server 116. It is anticipated that a mobile device 108 may navigate to and communicate across a communication network 104 with the communication system server 116 and associated memory 124 by presenting a network address to the mobile device 108, including but not limited to, an NFC tag, barcode, QR code, and URL. In some cases, information associated with a specific receiver 128 may be stored in the associated memory 124 and/or associated with the presented network address.

A communication system server 116, in accordance with embodiments of the present disclosure, may comprise a communication server or other dedicated processor that functions to communicate with at least one manufacturing resource in the production of access credentials for one or more receivers 128. Additionally or alternatively, the communication system server 116 may communicate with a communication system server 116. In some embodiments, the credentials manufacturing server may receive order instructions from the communication system server 116. The order instructions may include user information that can be used in manufacturing access credentials for a receiver 128. It is anticipated that the communication system server 116 may at least provide a manufacturing status of a user's access credentials to a communication system server 116 and/or a receiver 128. In some embodiments this status may be provided automatically, while in other embodiments the status may be provided in response to a query initiated by a receiver 128 and/or a communication system server 116.

Among other things, the communication system server 116 may be associated with a server memory 124. The server memory 124 may be configured to store information relating to manufacturing instructions, user credentials manufacturing status, manufacturing facility status, and the like. As can be appreciated, various applications on the node 120 at least provide the credentials manufacturing functionality as disclosed herein. In at least one embodiment, the functionality of the communication system server 116 and the communication system server 116 may be operated via a single server.

In some embodiments, a link 132 may be provided. The link 132 may be configured to allow a mobile device 108 to retrieve at least one application for use in the access credentials creation disclosed herein. The at least one application can be any higher level software that executes particular access credentials creation functionality for a receiver 128. In some embodiments, the link 132 may represent any memory or data storage, and the management software associated therewith, for storing the at least one application. Additionally or alternatively, the link 132 may be accessed by a mobile device 108 across a network 104 by providing the mobile device 108 with a network address of the link 132. In some cases, the link 132 may be private. In other words, the network address of the link 132 may be hidden, or separately located, from one or more of a public network, the Internet, unauthorized users, and the like.

Figure 2:
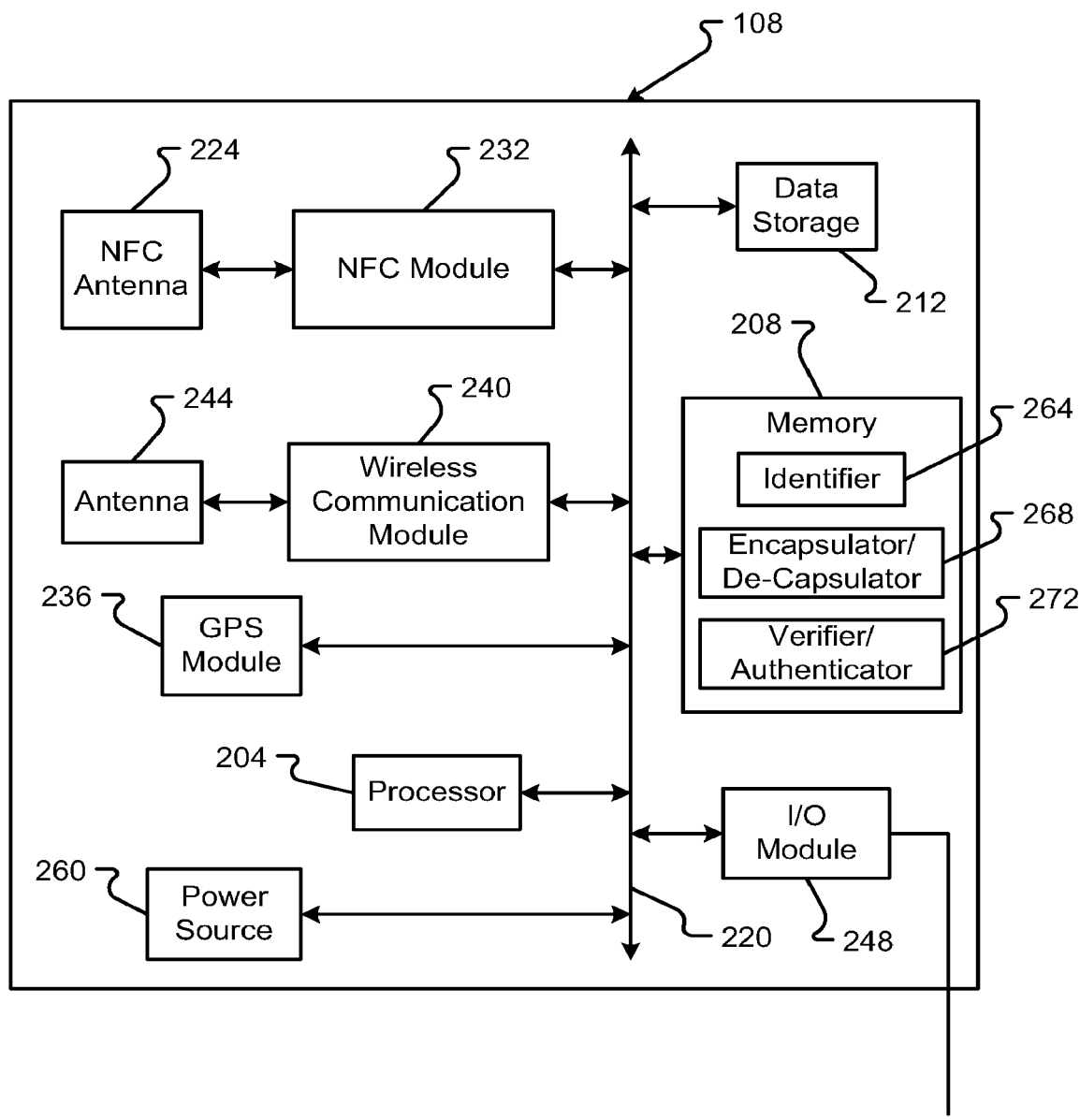
FIG. 2 is a block diagram of an embodiment of the hardware of the mobile device that may provide a credential to a receiving entity.

FIG. 2 illustrates components of a mobile device 108. In general, the mobile device 108 may comprise one or more of a processor 204, a memory 208, a data storage 212, a NFC module 232, a NFC antenna 224, an image capture interfaces/devices 252, and a power source 260. Some configurations of the mobile device 108 may additionally include a Global Positioning System ("GPS"), or equivalent geographical location module, 236, a wireless communication module 240, an antenna 244, an Input/Output ("I/O") module 248, and more. In some cases, the mobile device 108 may comprise various NFC components that form an NFC transceiver (e.g., a NFC antenna 224, a NFC module 232, a power source 260, and/or a processor 204 etc.).

The processor 204 may comprise a general purpose programmable processor or controller for executing application programming or instructions. The processor 204 may include multiple processor cores, and/or implement multiple virtual processors. Additionally or alternatively, the processor 204 may include multiple physical processors. In an example, the processor 204 may comprise a specially configured application specific integrated circuit (ASIC) or other integrated circuit, a digital signal processor, a controller, a hardwired electronic or logic circuit, a programmable logic device or gate array, a special purpose computer, or the like. The processor 204 generally functions to execute computer-readable programming code or instructions, which may be stored in memory 208, implementing various functions of the mobile device 108.

A mobile device 108 may also include memory 208 for use in connection with the execution of application programming or instructions by the processor 204, and for the temporary or long term storage of program instructions and/or data. As examples, the memory 208 may comprise RAM, DRAM, SDRAM, or other solid state memory. Alternatively or in addition, data storage 212 may be provided. Like the memory 208, the data storage 212 may comprise a solid state memory device or devices. Alternatively or in addition, the data storage 212 may comprise a hard disk drive or other random access memory.

The mobile device 108 may include at least one NFC chip, or module, 232 and at least one associated NFC antenna 224. As can be appreciated, the NFC chip/module 232 may comprise one or more of the NFC antenna 224 and at least one secure element. The NFC module 232 may be configured to produce a magnetic field via the NFC antenna 224. This magnetic field produced by the NFC module 232 and antenna 224 may be configured to induce corresponding electrical activity in an NFC tag. In turn, a passive NFC tag may generate its own a radio field, using the power borrowed from the mobile device 108 that may be supplied via the magnetic field. It is an aspect of the present disclosure that the NFC module 232 and NFC antenna 224 may detect and even interpret the radio field (e.g., within the NFC range, 13.56 MHz) produced by the NFC tag. In some cases, the radio field produced by the NFC tag may initiate one or more applications and/or features used by the mobile device 108.

In addition, the NFC module 232 may include security features that may be employed to encrypt, decrypt, and/or store secure information. The NFC module 232 may communicate with other components of the mobile device 108 and/or communication system 100 to prepare and exchange data.

In support of communications functions or capabilities, the mobile device 108 can include a wireless communication module 240. As examples, the wireless communication module 240 can comprise a GSM, CDMA, FDMA and/or analog cellular telephony transceiver capable of supporting voice, multimedia and/or data transfers over a cellular network. Alternatively or in addition, the wireless communications module 240 can comprise a Wi-Fi, BLUETOOTH™, WiMax, infrared, or other wireless communications link. The wireless communications module 240 can be associated with a shared or a dedicated antenna 244.

An I/O module 248 and associated ports may be included to support communications over wired networks or links, for example with other communication devices, server devices, and/or peripheral devices. Examples of I/O include an Ethernet port, a Universal Serial Bus (USB) port, Institute of Electrical and Electronics Engineers (IEEE) 1394, or other interface.

The mobile device 108 can also include a satellite positioning system, or geographical location system, module/receiver 236 such as the Global Positioning System ("GPS") (US), GLONASS (Russia), Galileo positioning system (EU), Compass navigation system (China), and Regional Navigational Satellite System (India). A GPS receiver may further comprise a GPS module 236 that is capable of providing absolute location information to other components of the mobile device 108 and/or communication system 100. A geographical location of the mobile device 108 may be determined by the device's location-based features, a location signal, and/or combinations thereof. The location-based features, and corresponding module 236, may utilize data from one or more satellite positioning systems (e.g., GPS), WiFi access points, cell towers, and the like.

One or more image capture interfaces/devices 252, such as a camera, can be included for capturing still and/or video images. Alternatively or additionally, an image capture interface/device 252 can include a scanner or code reader. An image capture interface/device 252 can include or be associated with additional elements, such as a flash or other light source. As can be appreciated, a mobile device 108 may have a plurality of image capture interfaces/devices 252. The image capture interface/device 252 may be located on a side of the mobile device 108 such that a receiver 128 may view and even align a live image of the receiver 128 on a screen associated with the mobile device 108. This image capture interface/device 252 arrangement may be equivalent to the front-facing camera found on smart phones, tablets, PCs, etc.

Communications between various components of the mobile device 108 may be carried by one or more buses 220. Moreover, power can be supplied to the components of the mobile device 108 from a power source and/or power control module 260. The power control module 260 may, for example, include a battery, an AC to DC converter, power control logic, and/or ports for interconnecting the mobile device 108 to an external source of power.

The memory 208 can store computer-readable instructions that may be executed to perform functions or operations described herein. The computer-readable instructions can cause the processor 204 to execute one or more modules, including one or more of, but not limited to, an identifier 264, an encapsulator/de-capsulator 268, and/or a verifier/authenticator 272. It should be noted that the intermediate bearer nodes 120 may also execute these modules.

Figure 4:
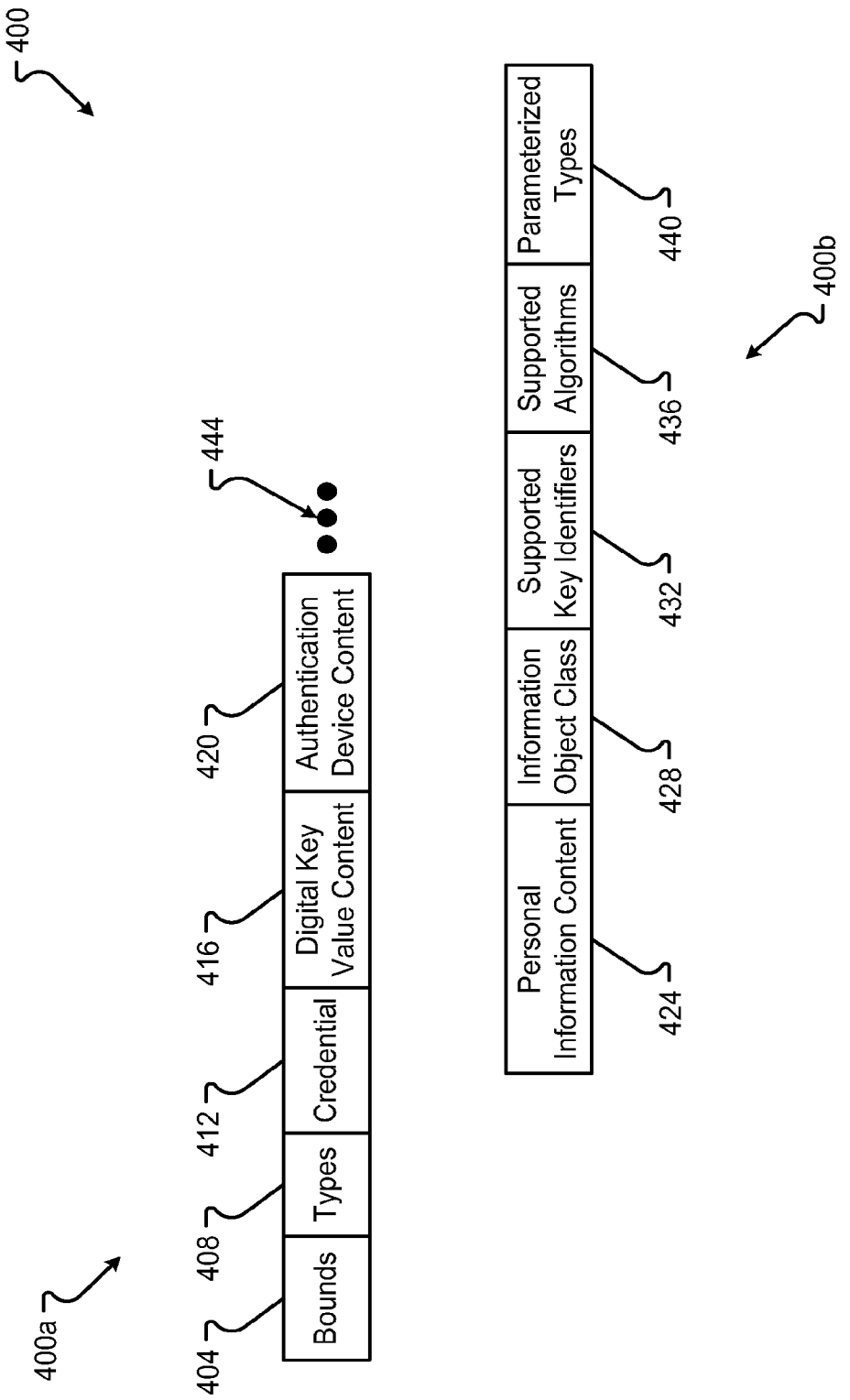
FIG. 4 is a block diagram of an embodiment of a message structure for a message that may be sent from a sending entity to a receiving entity.

The identifier 264 can read and recognize messages, as described in conjunction with FIGS. 3A through 4. If the messages received by the mobile device 108 (or by an intermediate bearer node 120) cannot be interpreted or is not addressed to the device 108 or node 120, the identifier 264 can ignore the message. However, if the message 300/400 is recognized, the identifier 264 can pass the message to the encapsulator/de-capsulator 268.

The encapsulator/de-capsulator 268 can read and or write the wrapper for the message 300/400. Thus, if the identifier 264 passes a message 30/400 to the encapsulator/de-capsulator 268, the encapsulator/de-capsulator 268 can read the portions of the encapsulation as described herein. The information, data, metadata, etc. included in the message encapsulation 300/400 may then be passed to the verifier/authenticator 272 to ensure the authenticity of the message 300/400. If the device 108 or node 120 is to create and encapsulation, as described in conjunction with FIGS. 3A through 4, the encapsulator/de-capsulator 268 can create the data, algorithms, metadata, etc. to write into the wrapper. The encapsulator/de-capsulator 268 may then provide the encapsulated packet for transmission to the next node 120, device 108, or receiver 128.

Information from the encapsulator/de-capsulator 268 can be received by the verifier/authenticator 272. The verifier/authenticator 272 can execute or conduct and positive insertion in the information provided by the encapsulator/de-capsulator 268. Thus, the verifier/authenticator 272 can conduct decryptions, authentications, other operations, etc. required by any positive assertion. Further, the verifier/authenticator 272 may create a positive assertion and/or any data associated with the positive assertion. The positive assertion may be provided to the encapsulator/de-capsulator 268 for inclusion in a packet encapsulation.

A message structure 300 for encapsulating and/or packetizing data or credentials may be as shown in FIG. 3. Here, the message data structure 300 can include one or more portions 304-316, which may each be associated with different encapsulations or layers. For example, the portions can include one or more of, but are not limited to, a credential/data portion 304, a first packet encapsulation 308, a second packet encapsulation 312, and/or an nth packet encapsulation 316. There may be more or fewer packet encapsulations 308-316 than those shown in FIGS. 3A and 3B, as represented by ellipses 320.

Generally, the encapsulated data packet can includes a credential or data 304 as a portion of the packet. The credential can be provided to allow the user to access a physical location, information, etc. It should be noted that the message 300 can include data that is not associated with a credential. The message 300 may also include several layers of encapsulation represented by packet 1 308, packet 2 312, and packet N 316. There may be more or fewer layers of encapsulation than those shown in FIG. 3A, as represented by ellipses 320. Each packet of encapsulation 308-316 may include information or data used to verify the authenticity of the encapsulation. A packet encapsulation 308-316, as shown in FIG. 3A, may be included in a message header and/or message footer. The data included in the packets 300 may be as described in conjunction with FIG. 4.

Each layer of encapsulation 308 through 316 may be generated by the sender 116. In other configurations, each intermediate bearer nodes 120, 108 can create a layer of encapsulation. For example, a first packet encapsulation 308 may be provided by the sender 116. After sending the packet 300 to node N 120N, node N 120N can provide the second layer of encapsulation 312. A final intermediate bearer node, which may be the device 108, may provide the final layer of encapsulation 316. As such, the layers of encapsulation 308-316 may be created by each subsequent intermediate bear node 1202, 308 until the complete packet 300 is finished and sent to the receiver 128.

As shown in FIG. 3B, the sender 116 may generate the several encapsulations 312 and 308 and then send the packet to the receiver 128. Upon each node 120, 108 receiving the encapsulated packet, the node 120, 108 can determine if at least one encapsulation was directed to that node 120, 108.

For example, encapsulation 312 may be for node 120N, and node 120N may read and verify the message as authentic. This authenticated or verified message may then be sent on to the next node 120, 108 or receiver 128. In another configuration, the sender 116 can generate the first packet encapsulation 308 send the packet 300 to node 120N, which then would generate the second encapsulation 312. Then, the receiver 128 can receive the packet 300 with the several encapsulations 308-316 and verify each encapsulation. In this way, the encapsulation of the data is flexible and may be completed in several different processes by several different nodes 120, 108 and/or by the sender 116.

A message structure 400 including a syntax for encapsulating and/or packetizing data or credentials may be as shown in FIG. 4. Here, the message information can include one or more portions or classes 404-440, which may each be associated with a positive assertion. Each portion may include different species of information. The portions or classes of message information can include one or more of, but are not limited to, a bounds class 404, a types class 408, a credential class 412, a digital key value content class 416, an authentication device content class 420, a personal information content class 424, an information object class 428, a supported key identifiers class 432, a supported algorithms class 436, and/or parameterized types class 440. There may be more or fewer portions than those shown in FIG. 4, as represented by ellipses 444.

The message structure 400 may include any data, information, positive assertions generated either by a sender 116 or a node 120, 108 and then received, understood, and/or read and verified by a node 120, 108 and/or a receiver 128. The information 400A and 400B may be provided as a single set of information within a packet header or footer. The message classes may have specific species of information that may be presented herein as an ASN.1 description (although other types of encoding or protocols may be used). Each of these classes 404 through 440 can have several different species as will be presented hereinafter with a short description of what those species may include.

A bounds class 404 can provide a maximum and minimum integer length for any octet string provided in the message 300/400. As such, the bounds class 404 may include a species for the maximum string length provided below:

size-max-NameLength INTEGER::=255

The minimum data length may be provided by the species below:

size-max-SecurityCondition INTEGER::=16

A types class 408 may define the different types of data that may be provided within the message structure 400. One of the species of the types class 408 can be a name for the type as provided by the species shown below:

Name::=VisibleString {SIZE(1 . . . size-max-NameLength)}

An identifier species, in the types class, can provide an identifier (ID) that functions as an object identifier other type of identifier for a portion of data or other information. The identifier species may be as provided below:

```
Identifier :: =    CHOICE  {
    full               OBJECT IDENTIFIER,
    relative           RELATIVE-OID,
    number             INTEGER,
    uid                OCTET STRING,
    string             IA5String
}
```

A version species can identify versions of information or data, for example, security keys or other algorithms. The version species may be as provided below:
Version::=INTEGER {v1 (0), v2(1), v3(2)}
A time species can provide a time, for instance, a universal time code. The time species may be as provided below:

```
Time ::= CHOICE      {
    utcTime          UTCTime,
    generalizedTime  GeneralizedTime
}
```

A printable string species can provide information that may be printed to a screen or to a tangible media. The printable string species may be as provided below:
URL::=PrintableString
A credential class 412 can include various information about credentials that may be checked or provided within the data structure of the message 300/400. The credential class 412 can include a credential for message verification or to provide to a receiver. The credential class can include a credential species. The credential species may include an identifier for the credential and may include a list of secure credentials (described hereinafter), as provide below:

```
Credential ::= SEQUENCE  {
    identifier           Identifier OPTIONAL,
    secureCredential     SET OF SecureCredential,
    dsx                  SET OF DSX OPTIONAL
}
```

The secure credential species can include an identifier for the secure credential, which can be reference by the credential species above, and may include a credential element (described hereinafter). Further, the secure credential species can include a set of access rules (described hereinafter). The secure credential may be as provide below:

```
SecureCredential ::= SEQUENCE  {
    identifier         Identifier OPTIONAL,
    credentialElement  CredentialElement,
    accessRules        SET OF AccessRule
                       OPTIONAL
}
```

The credential element species can be the content for the credential. The credential element species may include a content type designator and a content field. Further, the credential element species may also include a set of security elements (described hereinafter). The credential element species may be as provided below:

```
CredentialElement ::= SEQUENCE  {
contentType                [0] ContentType,
content                    [1] CONTENT.&Type({Content} {@contentType})
OPTIONAL
securityElements           [2] SEQUENCE OF SecurityElement
OPTIONAL
}
```

The security element species can include information or data relate to security checks or authentications for the credential. Thus, the security element species can include a sequence of key set identifiers (described hereinafter), cipher text, a signature, etc. The security element species may be as provided below:

```
SecurityElement ::= SEQUENCE {
keySet           SEQUENCE OF KeySetIdentifier({KeyIdentifiers}),
securityElement  CHOICE {
ciphertext       [0] OCTET STRING,
signature        [1] OCTET STRING,
hmac             [2] OCTET STRING,
...    -- For future extensions
}
```

The security state species can provide for a security algorithm that may be used to authenticate the credential. The security state species can include a name designator, an algorithm identifier (described hereinafter), and a key set identifier (described hereinafter). The security state species may be as provided below:

```
SecurityState: : = SEQUENCE {
name        Name OPTIONAL,
algorithm   AlgorithmIdentifier,
keySet      KeySetIdentifier ({KeyIdentifiers})
}
```

A security condition species can provide a set of checks for the security state species or access rules (described hereinafter). Thus, the security condition species may include a security state designator, one or more Boolean parameters (e.g., always, never, not, and, etc.), and/or a size parameter for the security conditions The security condition species may be as provided below:

```
SecurityCondition::= CHOICE {
securityState           [0] SecurityState,
always                  [ 1 ] BOOLEAN,
never                   [ 2 ] BOOLEAN,
not                     [3] SecurityCondition,
and                     [4] SEQUENCE
SIZE (1 .. size-max-SecurityCondition) OF
    SecurityCondition,
or                      [5] SEQUENCE
SIZE (1 .. size-max-SecurityCondition) OF
    SecurityCondition
}
```

An access rule (referenced above) can include the rules or positive assertions required to access the message or the credential. Thus, the access rule species can include an operation designator (described hereinafter) and a designator to a security condition (what the operation should compare to). The access rule may be as provided below:

```
AccessRule ::= SEQUENCE {
    operation           Operation,
    securityCondition   SecurityCondition
}
```

An operation species can include a type of operation that may required to access the credential or message either by a receiver or an intermediate bearer note. The operations can include checking data, decrypting data, etc. Other operations are possible that may not be listed or that may not be required to access the credential or message. The operation species may be as provided below:

```
Operation ::= BIT STRING {
    check           (0),
    create          (1),
    update          (2),
    read            (3),
    delete          (4),
    report          (5),
    decrypt                     (6),
    encrypt                     (7)
        -- For future extensions
}
```

A key usage species can provide requirements for how a key is to be used. The key usage species may be as provided below:

```
KeyUsage ::= BIT STRING {
    digitalSignature        (0),
    contentCommitment       (1),
    keyEncipherment         (2),
    dataEncipherment        (3),
    keyAgreement            (4),
    keyCertSign                     (5),
    cRLSign                         (6),
    encipherOnly                    (7),
    decipherOnly                    (8)
        -- For future extensions
}
```

A digital key value content class 416 can include information about digital key values. The digital key value content class 416 may have two or more message structures, for example, a digital key value object identifier and a digital key value. The digital key value object identifier can identify an object associated with the digital key. The digital key value object identifier species may be as provided below:

```
digitalKeyValueOID OBJECT IDENTIFIER ::=
    {iso(1) identified-organization (3) dod(6) internet (1)
        private (4) enterprises (1) hid(29240) dsx(7) key(1)}
```

The digital key value species can include a key value to authenticate credentials or the message (as described above). The digital key value species may be as provided below:
DigitalKeyValue::=OCTET STRING The authentication device content class 420 can include information on authenticating a device or verifying a device is appropriate to receive or forward the message. The authentication device content may include an authentication device object identifier, which is similar to the digital key value object identifier, in that the authentication device object identifier provides for information or objects associated with the authentication of the device. The authentication device object identifier species may be as provided below:

```
authenticationDeviceOID OBJECT IDENTIFIER ::=
    {iso(1) identified-organization (3) dod(6) internet(1)
        private(4) enterprises (1) hid(29240) dsx(7) device(2)}
```

An authentication device species includes a choice of which type of device may be authenticated. The authentication device species may be as provided below:

```
AuthenticationDevice ::= CHOICE {
    smartCard               [0] SmartCard,
    mobilePhone             [1] MobilePhone
        -- For future extensions
}
```

A smart card species can include information used to authenticate a smart card. The smart card species may be as provided below:

```
SmartCard :: = CHOICE {
    vingCard                [0] OCTET STRING,
    pivCard                 [1] OCTET STRING,
    iCLASSCard              [2] OCTET STRING,
    mifareCard              [3] MifareCard
        -- For future extensions
}
```

A MIFARE card species can include information used to authenticate a MIFARE card. The MIFARE card species may be as provided below:

```
MifareCard::= SEQUENCE {
    identification          OCTET STRING,
    description             MifareMetaData,
    sectors                 SET OF MifareSector
}
```

A MIFARE metadata species can include metadata regarding the MIFARE card or the authentication required of the MIFARE card. The MIFARE metadata species may be as provided below:

```
MifareMetaData: := SEQUENCE
    label                   Name,
    beginDate               Time,
    endDate                 Time,
    configuration           URL OPTIONAL
}
```

A MIFARE mode species can include printable information about the MIFARE mode used by the MIFARE card. The MIFARE mode species may be as provided below:
MifareMode::=PrintableString {FROM ("A"|"B")}
A MIFARE sector species can include information about authentication data used by the MIFARE card. The MIFARE sector species may be as provided below:

```
MifareSector ::= SEQUENCE {
    offset                      INTEGER,
    readMode MifareMode         OPTIONAL,
    readAuthenticationKey       OCTET STRING,
    writeMode MifareMode        OPTIONAL,
    writeAuthenticationKey      OCTET STRING,
    dataBlocks                  SET OF MifareSectorData,
    trailer                     OCTET STRING
}
```

The MIFARE sector data species can include the MIFARE data used by the MIFARE card. The MIFARE sector data species may be as provided below:

```
MifareSectorData ::= SEQUENCE
    offset              INTEGER,
    data                OCTET STRING
}
```

A mobile phone species can include information used to authenticate the mobile phone. The mobile phone species may be as provided below:

```
MobilePhone ::= SEQUENCE {
    imsi                OCTET STRING,
    imei                OCTET STRING
                        -- For future extensions
}
```

A personal information contact class 424 can include information about a person that is used to authenticate or identify that person as a positive assertion. The personal information object identifier species, within the personal information contact class 424, can include information about how to identify and/or authenticate that the correct person is using the message. The personal information object identifier species may be as provided below:

```
personalInformationOID OBJECT IDENTIFIER ::=
    {iso(1) identified-organization (3) dod(6) internet(1)
        private(4) enterprises (1) hid(29240) dsx(7) personal
(3)}
```

A personal information species can include the information used by the personal information object to verify that the correct person is using the message or credentials in the message. The personal information species may be as provided below:

```
PersonalInformation ::= SEQUENCE {
    name                Name,
    age                 INTEGER
                        -- For future extensions
}
```

An information object class 428 can include information about different content used to authenticate the device, the person, or the credential. For example, an algorithm identifier species can include information about an algorithm to be used in the credential verification and authentications described above. The algorithm identifier species may be as provided below:

```
ALGORITHM-IDENTIFIER::= CLASS {
    &id OBJECT IDENTIFIER UNIQUE,
    &Type OPTIONAL }
    WITH SYNTAX { OID &id [WITH &Type]
}
```

An algorithm identifier sequence species can include information about a sequence of algorithm identifiers that may be used on information to authenticate a credential. The algorithm identifier sequence species may be as provided below:

```
AlgorithmIdentifier ::= SEQUENCE {
algorithm ALGORITHM-IDENTIFIER.&id({SupportedAlgorithms}),
parameters ALGORITHM-IDENTIFIER.&Type({SupportedAlgorithms}
```

-continued

```
{@algorithm}} OPTIONAL
}
```

A key identifier species and/or key set identifier can identify a key that may be used in the authentication in any of the different authentications described herein. The key identifier species may be as provided below:

```
KEY-IDENTIFIER ::= CLASS
&id INTEGER UNIQUE,
&Value
} WITH SYNTAX { SYNTAX &Value IDENTIFIED BY &id }
KeySetIdentifier {KEY-IDENTIFIER: IdentifierSet} ::= SEQUENCE
idType KEY-IDENTIFIER.&id ({IdentifierSet}),
idValue KEY-IDENTIFIER.&Value ({IdentifierSet} {@idType})
}
```

A content type identifier species may include information about what type of content may be authenticated. The content type identifier species may be as provided below:
    CONTENT::=TYPE-IDENTIFIER A content data species can include information about the digital key, the device authentication, or personal information authentication described herein. The content data species may be as provided below:

```
Content CONTENT ::= {
{DigitalKeyValue         IDENTIFIED BY digitalKeyValueOID }
{AuthenticationDevice    IDENTIFIED BY authenticationDeviceOID }
{PersonalInformation     IDENTIFIED BY personalInformationOID },
    -- additional application-specific types/contents
}
```

A content type species can include information about other content that may be used in the verification of the message. The content type species may be as provided below:
    ContentType::=CONTENT.&id({Content})

A content information species can include a sequence of content types and other data used to verify the message. The content information species may be as provided below:

```
Content Info :: = SEQUENCE {
contentType              ContentType ,
content                  [0] EXPLICIT
CONTENT.&Type({Content} {@contentType}) OPTIONAL
}
```

A supported key identifiers class 432 can include information about the keys that may be used in the authentications described herein. A key identifier species can include serial numbers, hash values, and other information about the keys to be used for the authentication of the message. The key identifier species may be as provided below:

```
KeyIdentifiers KEY-IDENTIFIER ::= { ... , --extensible
issuerAndSerialNumber
issuerAndSerialNumberHash
subjectKeyId
subjectKeyHash
issuerKeyHash
issuerNameHash
subjectNameHash
}
```

An opaque data species can include information about the key identifier, the hashes, and other information about the types of keys to be used in an authentication described herein. The opaque data species may be as provided below:

```
OPAQUE ::= TYPE-IDENTIFIER
issuerAndSerialNumber KEY-IDENTIFIER::=
    {SYNTAX OPAQUE.&Type IDENTIFIED BY 1}
    -- As defined in RFC 2630
subjectKeyId KEY-IDENTIFIER ::=
    {SYNTAX OCTET STRING IDENTIFIED BY 2}
    -- From x509v3 certificate extension
issuerAndSerialNumberHash KEY-IDENTIFIER ::=
    {SYNTAX OCTET STRING IDENTIFIEb BY 3}
    -- Assumes SHA-1 hash of DER encoding of IssuerAndSerialNumber
subjectKeyHash KEY-IDENTIFIER ::=
    {SYNTAX OCTET STRING IDENTIFIED BY 4}
issuerKeyHash KEY-IDENTIFIER ::=
    {SYNTAX OCTET STRING IDENTIFIED BY 5}
issuerNameHash KEY-IDENTIFIER ::=
    {SYNTAX OCTET STRING IDENTIFIED BY 6}
    -- SHA-1 hash of DER-encoded issuer name
subjectNameHash KEY-IDENTIFIER ::=
    {SYNTAX OCTET STRING IDENTIFIED BY 7}
    -- SHA-1 hash of DER-encoded subject name
```

A supported algorithms class 436 includes information about the algorithms that may be used for any of the authentications or verifications described herein. Therefore a supported algorithms identifier species can identify the algorithms that may be executed by either the intermediate bearer node 120, 108, the receiver 128, or the sender 116. The supported algorithms identifier species may be as provided below:

```
SupportedAlgorithms ALGORITHM-IDENTIFIER ::= { ... /
    --extensible
    sha1
}
```

The algorithm identifier species can include an identifier for the different objects or structure that store the algorithms. The algorithm identifier species may be as provided below:
    sha1 ALGORITHM-IDENTIFIER::={OID id-sha1 WITH SHA1Parameters}
The ID sha1 object identifier species includes which algorithm parameters may be used in the object algorithm for verification or authentication. The ID sha1 object identifier species may be as provided below:

```
id-sha1 OBJECT IDENTIFIER::= {iso(1} identified-organization (3)
oiw(14)
    secseg(3) algorithms (2) 26}
```

The parameter types class 440 can include information about different parameters for the supported algorithm(s). A hash sequence species can include information about conducting a hash value calculation on information with the supported algorithm. The hash sequence species may be as provided below:

```
HASH{ToBeHashed} ::= SEQUENCE {
algorithmIdentifier    AlgorithmIdentifier,
hashValue
    BIT STRING
        (CONSTRAINED BY {
            -- the result of applying a hashing
            -- procedure to the DER-encoded octets
            -- of a value of -- ToBeHashed})
}
```

The encrypted hash species can include information about conducting an encrypted hash calculation using algorithms supported and described herein. The encrypted hash species may be as provided below:

```
ENCRYPTED-HASH {ToBeSigned} ::=
    BIT STRING
        {CONSTRAINED BY {
    -- the result of applying a hashing procedure to the
    -- DER-encoded octets of a value of --ToBeSigned-- and
    -- then applying an encipherment procedure to those octets }}
```

The encrypted species can include information about executing a cipher on information described herein. The encrypted species may be as provided below:

```
ENCRYPTED{ToBeEnciphered} ::=
    BIT STRING
        (CONSTRAINED BY {
            -- the result of applying an encipherment procedure
            -- to the BER-encoded octets of a value of --
ToBeEnciphered})
```

The signature species can include information about conducting a signature or calculating a signature for data described herein using an algorithm described herein. The signature species may be as provided below:

```
SIGNATURE {ToBeSigned} ::= SEQUENCE {
    algorithmIdentifier    AlgorithmIdentifier,
    encrypted              ENCRYPTED-HASH {ToBeSigned}
}
```

A signed species can include information about which signatures to be used and how to sign the data. The signed species may be as provided below:

```
SIGNED{ToBeSigned} ::= SEQUENCE {
    toBeSigned        ToBeSigned,
    COMPONENTS OF SIGNATURE{ToBeSigned}
}
```

Figure 5:
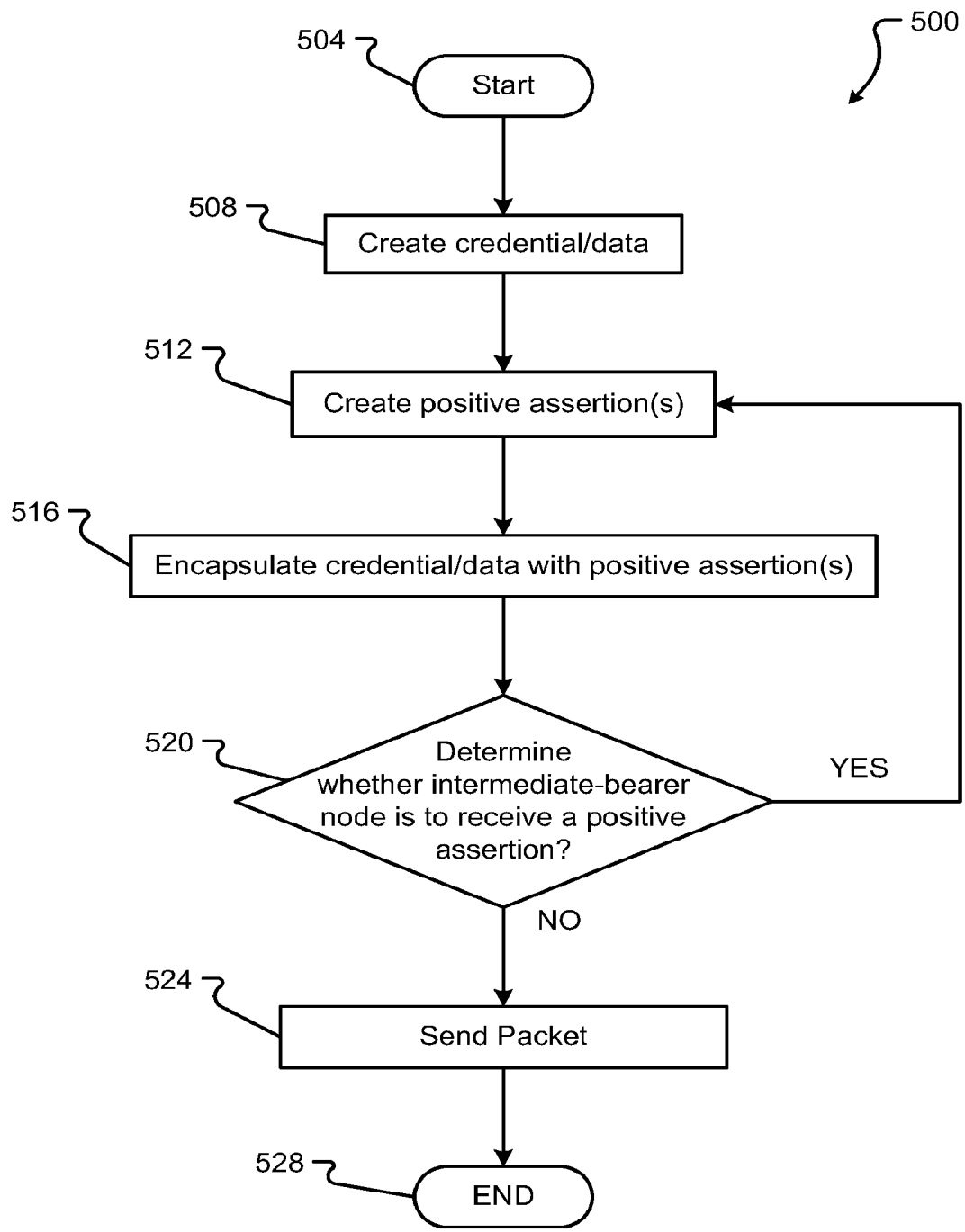
FIG. 5 is a flow diagram depicting an embodiment of a method for creating and encapsulating a message to be sent by a sending entity or intermediate bearer entity.

An embodiment of a method 500 for sending a message from a sending entity 116 is shown in FIG. 5. Generally, the method 500 begins with a start operation 504 and terminates with an end operation 528. While a general order for the steps of the method 500 are shown in FIG. 5, the method 500 can include more or fewer steps or arrange the order of the steps differently than those shown in FIG. 5. The method 500 can be executed as a set of computer-executable instructions, executed by a computer system, and encoded or stored on a computer readable medium. Further, the method 500 can be executed by a gate or other hardware device or component in an Application Specific Integrated Circuit, a Field Programmable Gate Array, or other type of hardware device. Hereinafter, the method 500 shall be explained with reference to the systems, components, modules, software, data structures, etc. described herein.

A sender 116 can create or receive credential data or other data, in step 508. The credential data can be any information or data, provided to an NFC tag, which may be used by a receiver 128 to allow a person, with device 108, access to a structure. There may be other data or credentials that may be supported by the processes described herein. The credential data may be as described in conjunction with FIG. 3A. The credential data may then be included in a message 300.

The sender 116 then can create one or more positive assertions, in step 512. A positive assertion may be a verification or authentication check to be conducted either by the receiver 128 or one or more intermediate bearer nodes 120, 108. These positive assertions can be any type of algorithm, hash, verification, authentication of the device or person, an encryption with a digital key, etc. The positive assertion may then be encapsulated in the data structure 400, as described previously in conjunction with FIG. 4. The positive assertion information then is encapsulated with the credential data, in step 516. Thus, the sender 116 can create a packet encapsulation 308 as described in conjunction with FIG. 3A.

The sender 116 may then determine whether an intermediate bearer node 120, 108 is to receive a positive assertion, in step 520. If the sender 116 is to have one of the intermediate bearer nodes 120, 106 conduct a verification or authentication based on a positive assertion, the sender 116 can generate another encapsulation for that intermediate bearer sender 120, 108. If a positive assertion is to be provided to an intermediate bearer node 120, 108, the method 500 proceeds YES back to step 512, where another packet encapsulation 312, with the new positive assertion, is created for the intermediate bearer node 120, 108. The encapsulations may be reiterated for two or more of the intermediate bearer nodes 120, 108, and thus, create the several encapsulations, as described in conjunction with FIG. 3A. However, if there is no positive assertion for intermediate bearer node 120, 108, the method 500 proceeds NO to step 524, where the sender 116 sends the packet, in step 524, through a network 104, to a device 108, or other user, to be provided to a receiver 128.

Figure 6A:
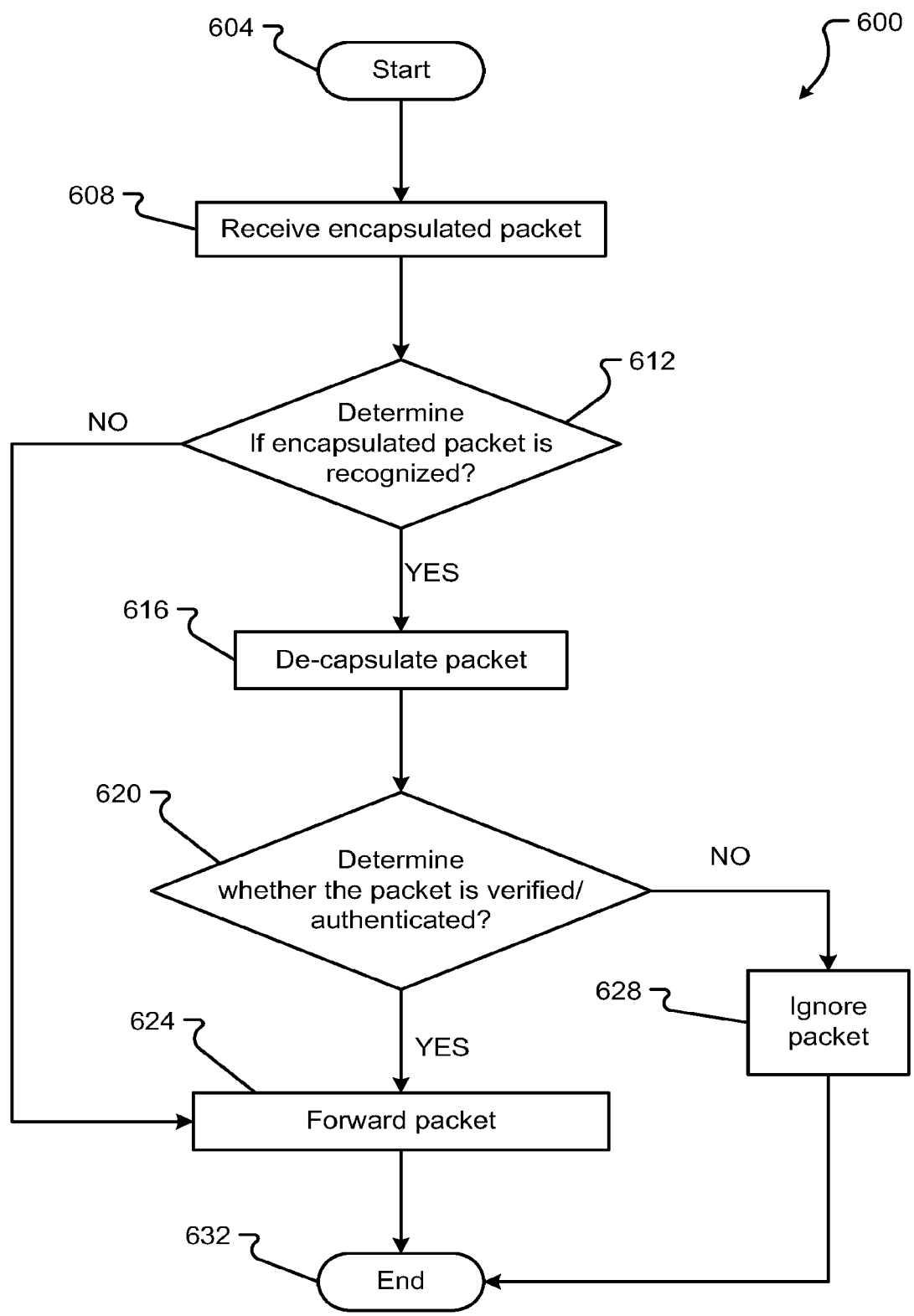
FIGS. 6A and 6B are flow diagrams depicting embodiments of methods for sending, encapsulating, receiving, de-capsulating, and/or interpreting messages received by a intermediate bearer entity.

An embodiment of a method 600 for receiving and forwarding a message by a bearer entity is shown in FIG. 6A. Generally, the method 600 begins with a start operation 604 and terminates with an end operation 632. While a general order for the steps of the method 600 are shown in FIG. 6A, the method 600 can include more or fewer steps or arrange the order of the steps differently than those shown in FIG. 6A. The method 600 can be executed as a set of computer-executable instructions, executed by a computer system, and encoded or stored on a computer readable medium. Further, the method 600 can be executed by a gate or other hardware device or component in an Application Specific Integrated Circuit, a Field Programmable Gate Array, or other type of hardware device. Hereinafter, the method 600 shall be explained with reference to the systems, components, modules, software, data structures, user interfaces, etc. described herein.

An intermediate bearer node 120, 108 can receive an encapsulated packet 300, in step 608. The encapsulated packet 300 may be read by the intermediate bearer node 120, 108 to determine if the packet is recognized, in step 612. The intermediate bearer node 120, 108 may determine if there is one or more information fields in the packet 300/400, attached to the credentials 304, that is understood to determine if the packet is recognized. In other examples, there may be a sync code or address directed to the intermediate bearer node 120, 108 that will be recognized. If the packet is recognized, the method 600 proceeds YES to step 616. If the packet is not recognized, the method 600 proceeds NO to step 624.

In step 616, the intermediate bearer node 120, 108 de-capsulates the packet by reading the information in section 400. The de-capsulation may then determine any type of verification, authentication, or positive assertion that must be verified, in step 620. Thus, the intermediate bearer node 120, 108 can be assigned or directed to complete a positive assertion using one or more of the data parameters in packet 400. If the packet is verified or authenticated, the method 600 proceeds YES to step 624. If the packet is not verified or authenticated, the method 600 proceeds NO to step 628 where the packet is ignored or discarded.

In step 624, the intermediate bearer node 120, 108 can forward the packet to the next node 120 or to the receiver 128. If the packet was not recognized, the node 120, 108 may function as a "dump pipe" where the packet is simply forwarded. However, if the packet was recognized and the information is verified and authenticated, the packet may have one less layer of encapsulation as described in conjunction with FIG. 3B.

Figure 6B:
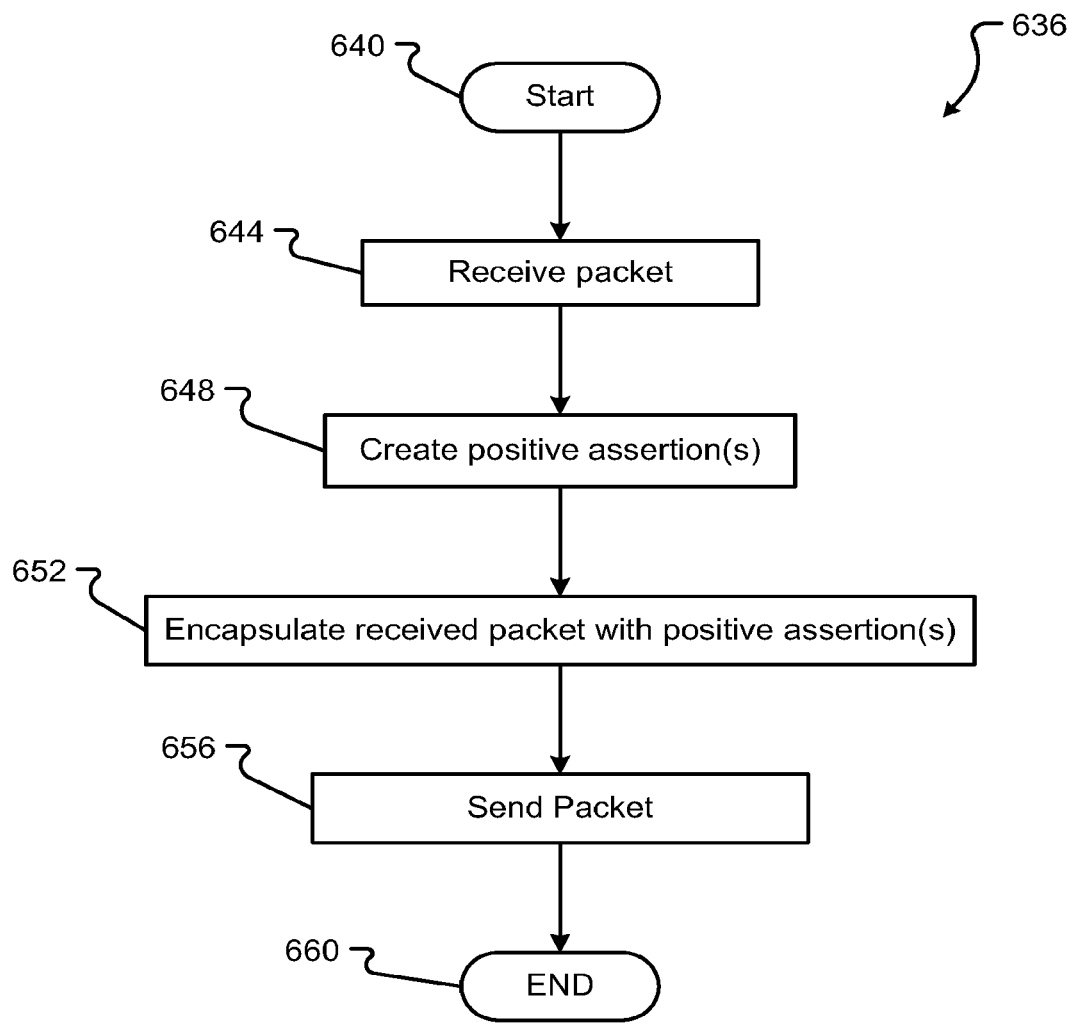

An embodiment of a method 636 for receiving and forwarding a message by an intermediate bearer node is shown in FIG. 6B. Generally, the method 636 begins with a start operation 640 and terminates with an end operation 660. While a general order for the steps of the method 636 are shown in FIG. 6B, the method 636 can include more or fewer steps or arrange the order of the steps differently than those shown in FIG. 6B. The method 636 can be executed as a set of computer-executable instructions, executed by a computer system, and encoded or stored on a computer readable medium. Further, the method 636 can be executed by a gate or other hardware device or component in an Application Specific Integrated Circuit, a Field Programmable Gate Array, or other type of hardware device. Hereinafter, the method 636 shall be explained with reference to the systems, components, modules, software, data structures, user interfaces, etc. described herein.

An intermediate bearer node 120, 108 can receive a packet, in step 644. Rather than determine if a positive assertion is made to the packet, as described in method 600, the intermediate bearer node 120, 108 may create its own positive assertion, in step 648. Here, the intermediate bearer node 120, 108 may provide data within packet information 400 to create a new encapsulation for the packet, in step 652. Thus, as explained in conjunction with FIG. 3B, the intermediate bearer node 120, 108 can create a further encapsulation beyond that which was already received. This new encapsulated packet may then be sent, in step 656. In this manner, the receiver 120 may be required to de-capsulate and authenticate or verify several positive assertions made by the intermediate bearer nodes 120, 108 and the sender 116, rather than having the message be verified or authenticated simply from information sent from the sender 116.

Figure 7:
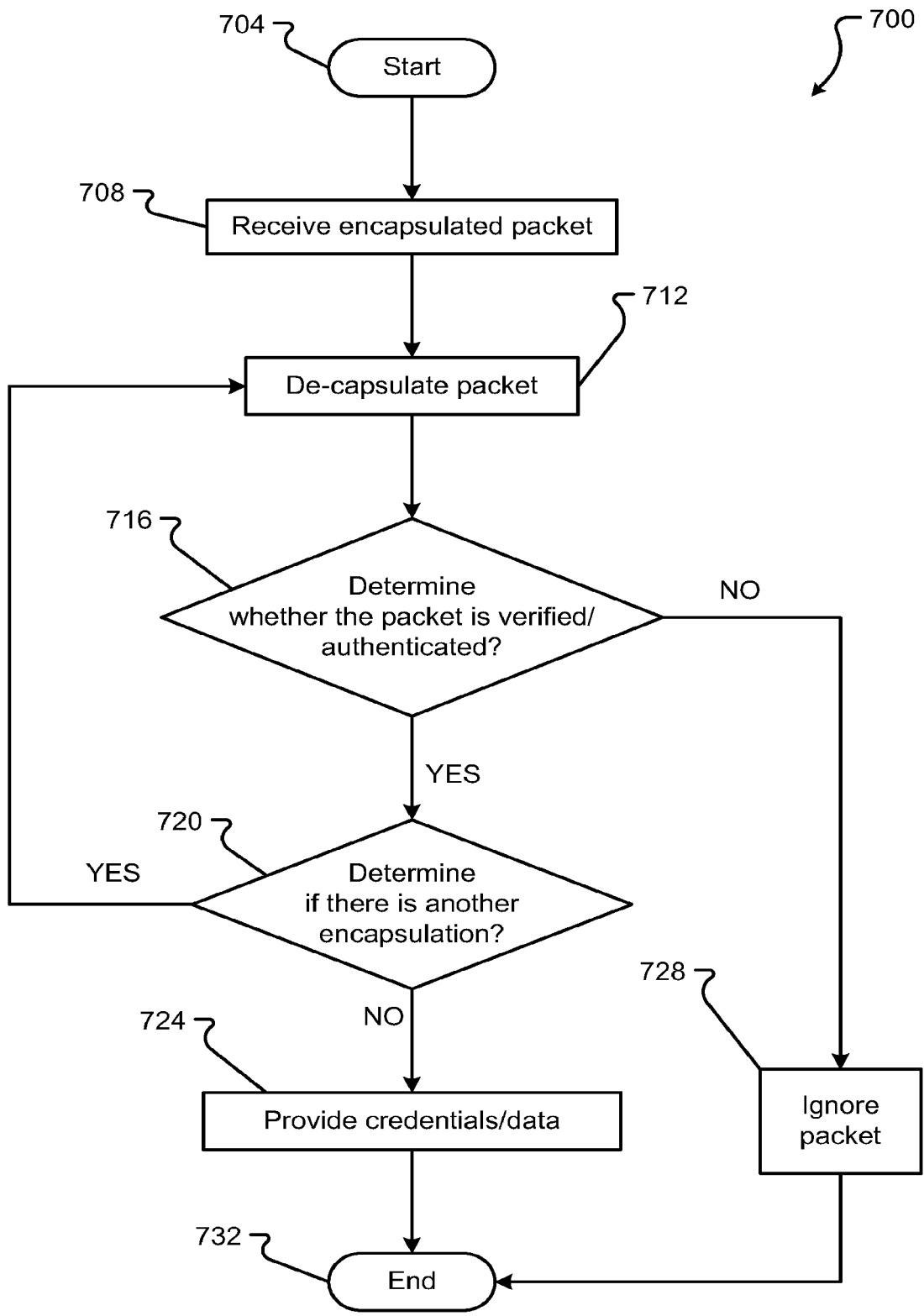
FIG. 7 is a flow diagram depicting an embodiment of a method for receiving, decapsulating, and/or interpreting a message received by a receiving entity.

An embodiment of a method 700 for receiving a message by a receiver or receiving entity 128 is shown in FIG. 7. Generally, the method 700 begins with a start operation 704 and terminates with an end operation 732. While a general order for the steps of the method 700 are shown in FIG. 7, the method 700 can include more or fewer steps or arrange the order of the steps differently than those shown in FIG. 7. The method 700 can be executed as a set of computer-executable instructions, executed by a computer system, and encoded or stored on a computer readable medium. Further, the method 700 can be executed by a gate or other hardware device or component in an Application Specific Integrated Circuit, a Field Programmable Gate Array, or other type of hardware device. Hereinafter, the method 700 shall be explained with reference to the systems, components, modules, software, data structures, user interfaces, etc. described herein.

The receiver 128 can receive an encapsulated packet, in step 708. Here, the packet may have several layers of encapsulation, as described in conjunction with FIG. 3A. The receiver 128 may de-capsulate the first layer of encapsulation, in step 712. The de-capsulation may include reading information in the section 400 of the message 300 to determine whether the packet is verified or authenticated, in step 716. Thus, the receiver 128 can execute operations and check information within the message 300 to check personal information, device information, content information, digital keys, or other types of credentials or positive assertions. The checks may be as directed by the intermediate bearer nodes 120, 108 or by the sender 116. If the packet encapsulation is verified, the method 700 proceeds YES to step 720. However, if the packet 300/400 is not verified or authenticated, the method 700 proceeds NO to step 728, where the packet 300/400 is ignored or discarded.

In step 720, the receiver 128 may determine if there is another encapsulation layer. This second encapsulation layer 312, if it is present, may require the method to proceed YES back to step 712 where that layer is de-capsulated. However, if there are no further encapsulations, the method 700 proceeds NO to step 724. In step 724, the receiver 128 is provided or receives the credentials or data within the packet 300. By performing the method 700, the receiver 128 can de-capsulate and authenticate various positive assertions either created by the sender 116 or intermediate bearer nodes 120, 108. Even if the packet has several layers of encapsulation as described in FIGS. 3B and 3A, the receiver 128 may authenticate or verify the encapsulation or other message information in each of the several layers.

Figure 8:
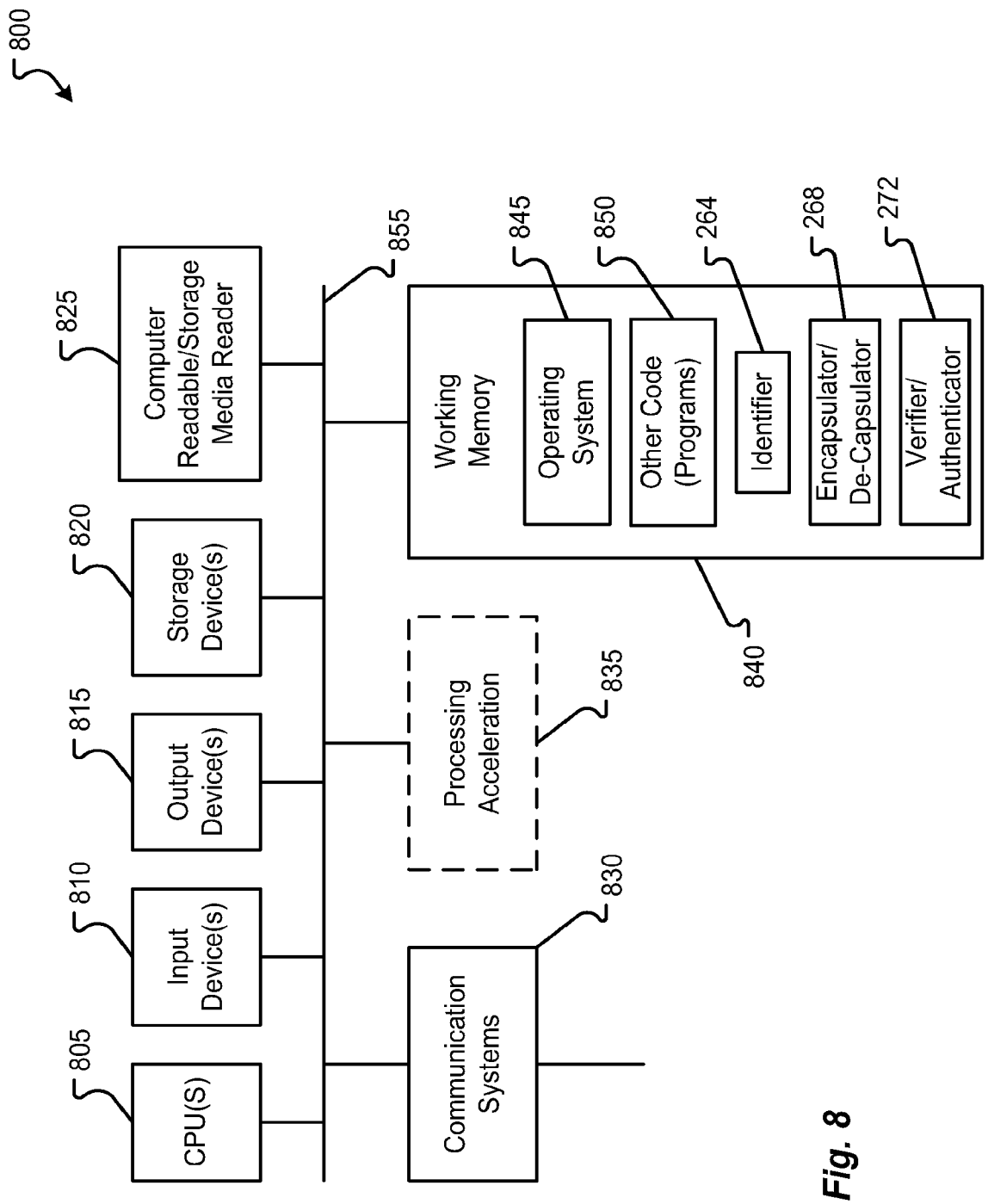
FIG. 8 is a block diagram of an embodiment of a computer system.

FIG. 8 illustrates one embodiment of a computer system 800 upon which the servers, computers, or other systems or components described herein may be deployed or executed. The computer system 800 is shown comprising hardware elements that may be electrically coupled via a bus 855. The hardware elements may include one or more central processing units (CPUs) 805; one or more input devices 810 (e.g., a mouse, a keyboard, etc.); and one or more output devices 815 (e.g., a display device, a printer, etc.). The computer system 800 may also include one or more storage devices 820. By way of example, storage device(s) 820 may be disk drives, optical storage devices, solid-state storage devices such as a random access memory ("RAM") and/or a read-only memory ("ROM"), which can be programmable, flash-updateable and/or the like.

The computer system 800 may additionally include a computer-readable storage media reader 825; a communications system 830 (e.g., a modem, a network card (wireless or wired), an infra-red communication device, etc.); and working memory 840, which may include RAM and ROM devices as described above. The computer system 800 may also include a processing acceleration unit 835, which can include a DSP, a special-purpose processor, and/or the like.

The computer-readable storage media reader 825 can further be connected to a computer-readable storage medium, together (and, optionally, in combination with storage device(s) 820) comprehensively representing remote, local, fixed, and/or removable storage devices plus storage media for temporarily and/or more permanently containing computer-readable information. The communications system 830 may permit data to be exchanged with the network 820 (FIG. 8) and/or any other computer described above with respect to the computer system 800. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 800 may also comprise software elements, shown as being currently located within a working memory 840, including an operating system 845 and/or other code 850. It should be appreciated that alternate embodiments of a computer system 800 may have numerous variations from that described above. For example, customized hardware might also be used and/or particular elements might be implemented in hardware, software (including portable software, such as applets), or both. Further, connection to other computing devices such as network input/output devices may be employed.

As a non-limiting example, the following message is a DER according to the ASN.1 syntax provided above. The example message provides a PIN (the credential) "1234" that is protected by a positive assertion that requires the entry of a second PIN (the second credential) "4321".

| CLAS | F | -ID- | LENGTH | HEX CONTENTS | ASCII |
|---|---|---|---|---|---|
| UNIV | P | OCTS | 4 | 31 32 33 34 | 1234 |
| CLAS | F | -ID- | LENGTH | HEX CONTENTS | ASCII |
| UNIV | P | OCTS | 4 | 34 33 32 31 | 4321 |
| CLAS | F | -ID- | LENGTH | HEX CONTENTS | ASCII |
| UNIV | C | SEQ | 86 | | |
| UNIV | C | SET | 84 | | |
| UNIV | C | SEQ | 82 | | |
| UNIV | P | IA5S | 28 | 41 20 50 49 4e 20 77 69 74 68 20 | A PIN with a |
| | | | | 61 20 50 49 4e 20 41 63 63 65 73 | PIN Access Rule |
| | | | | 73 20 52 75 6c 65 | |
| UNIV | C | SEQ | 20 | | |
| CTXT | P | 0 | 10 | 2b 06 01 04 01 81 e4 38 07 01 | =......8.. |
| CTXT | C | 1 | 6 | | |
| UNIV | P | OCTS | 4 | 31 32 33 34 | 1234 |
| UNIV | C | SET | 28 | | |
| UNIV | C | SEQ | 26 | | |
| UNIV | P | BITS | 2 | 00 10 | .. |
| CTXT | C | 0 | 20 | | |
| UNIV | C | SEQ | 7 | | |
| UNIV | P | OID | 5 | 2b 0e 03 02 1a | +.... |
| UNIV | C | SEQ | 9 | | |

-continued

| UNIV | P | INT  | 1 | 02          |      |   |
|------|---|------|---|-------------|------|---|
| UNIV | P | OCTS | 4 | 34 33 32 31 | 4321 |   |

```
Credential {
    secureCredential[0]
        identifier {
            string = 'A PIN with a PIN Access Rule'
        }
        credentialElement {
            contentType = { 1 3 6 1 4 1 29240 7 1 )
            content = 0x040431323334)
        accessRules[0]
            operation ~ { 8, 0x10
            securtityCondition {
                securityState {
                    algorithm {
                        algorithm (1 3 14 3 2 26 )
                    }
                    keySet {
                        idType ~ 2
                        idValue ~ 0x040434333231
                    }
                }
            }
        }
    }
}
```

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the Figures. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments have been described in detail herein, it is to be understood that the inventive concepts may be otherwise variously embodied and employed, and that the appended claims are intended to be construed to include such variations, except as limited by the prior art.

What is claimed is:

1. A method for processing a message including credential information, the method comprising:
    receiving a packet;
    extracting credential information from the packet, wherein the credential information comprises an access rule and an authentication device content class that comprises information for authenticating a device and for verifying that the device is authorized to receive and/or forward the credential information;
    analyzing the credential information extracted from the packet;
    determining, based on the analysis of the credential information extracted from the packet, that the device corresponds to a trusted entity; and
    based on determining that the device corresponds to a trusted entity, providing the credential information to a door lock to enable the door lock to perform an access control operation that is consistent with the access rule;
wherein providing the credential information to the door lock comprises:
encapsulating the credential information with a positive assertion and a credential class comprising a rule species directed to an intermediate bearer node; and
transmitting the encapsulated credential information with the positive assertion and the credential class to the intermediate bearer node to enable the intermediate bearer node to forward the credential information along to the door lock.

2. The method of claim 1, wherein the packet is received at a network node that is positioned between a sender and the door lock and wherein the network node provides the credential information to the door lock through the intermediate bearer node.

3. A method for processing a message including credential information, the method comprising:
receiving a packet;
de-capsulating the packet;
extracting credential information from the packet, wherein the credential information comprises an access rule and an authentication device content class that comprises information for authenticating a device and for verifying that the device is authorized to receive and/or forward the credential information;
analyzing the credential information extracted from the packet;
determining, based on the analysis of the credential information extracted from the packet, that the device corresponds to a trusted entity;
conducting an operation on the de-capsulated packet associated with verifying a positive assertion made by an intermediate bearer node positioned between the device and a door lock;
verifying the intermediate bearer node corresponds to a trusted node; and
based on determining that the device corresponds to a trusted entity and the intermediate bearer node corresponds to a trusted node, providing the credential information to the door lock to enable the door lock to perform an access control operation that is consistent with the access rule.

4. The method of claim 3, wherein the operation comprises decrypting the positive assertion and checking the positive assertion.

5. The method of claim 3, wherein the credential information comprises a mobile device species that comprises information used to authenticate a mobile device.

6. The method of claim 3, wherein the credential information comprises a personal information contact class that comprises information used to authenticate or identify a person as a positive assertion.

7. A system comprising:
a processor;
a memory coupled with the processor, the memory comprising instructions that, when executed by the processor, enable the processor to:
receive a packet;
de-capsulate the packet;
extract credential information from the packet, wherein the credential information comprises an access rule and an authentication device content class that comprises information for authenticating a device and for verifying that the device is authorized to receive and/or forward the credential information;
analyze the credential information extracted from the packet;
determine, based on the analysis of the credential information extracted from the packet, that the device corresponds to a trusted entity;
conduct an operation on the de-capsulated packet associated with verifying a positive assertion made by an intermediate bearer node positioned between the device and a door lock;
verify the intermediate bearer node corresponds to a trusted node; and
based on determining that the device corresponds to a trusted entity and the intermediate bearer node corresponds to a trusted node, provide the credential information to the door lock to enable the door lock to perform an access control operation that is consistent with the access rule.

8. The system of claim 7, wherein the device comprises a sender of the packet.

9. The system of claim 7, wherein the device comprises another intermediate bearer node positioned between a sender of the packet and the door lock.

10. The system of claim 7, wherein the processor and the memory are provided in a mobile device, the system further comprising an antenna that enables the mobile device to wirelessly transmit the credential information to the door lock.

11. The system of claim 7, wherein the credential information comprises a mobile device species that comprises information used to authenticate a mobile device.

12. The system of claim 7, further comprising a network interface configured to receive the packet, wherein the processor is coupled with the network interface.

13. The system of claim 12, further comprising an antenna that enables the credential information to be wirelessly transmitted to the door lock.

14. The system of claim 13, wherein the credential information is transmitted using at least one of a Bluetooth protocol and a Near Field Communication (NFC) protocol.

15. The system of claim 7, wherein the operation comprises decrypting the positive assertion and checking the positive assertion.

16. The method of claim 1, wherein the intermediate bearer node is a mobile device enabled to forward the credential information to the door lock via a wireless communication protocol.

17. The method of claim 3, wherein the packet is received at a mobile device and wherein the credential information is provided to the door lock via a wireless communication protocol.

18. The method of claim 17, wherein the wireless communication protocol comprises a Near Field Communication (NFC) protocol.

19. The method of claim 17, wherein the wireless communication protocol comprises Bluetooth.

* * * * *